US011709073B2

(12) United States Patent
Wang

(10) Patent No.: US 11,709,073 B2
(45) Date of Patent: Jul. 25, 2023

(54) TECHNIQUES FOR COLLABORATIVE MAP CONSTRUCTION BETWEEN AN UNMANNED AERIAL VEHICLE AND A GROUND VEHICLE

(71) Applicant: SZ DJI TECHNOLOGY CO., LTD., Guangdong (CN)

(72) Inventor: Mingyu Wang, Guangdong (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 203 days.

(21) Appl. No.: 17/097,393

(22) Filed: Nov. 13, 2020

(65) Prior Publication Data
US 2021/0131821 A1    May 6, 2021

Related U.S. Application Data

(63) Continuation of application No. PCT/CN2019/077504, filed on Mar. 8, 2019.

(51) Int. Cl.
G01C 21/00 (2006.01)
B64C 39/02 (2023.01)
B64U 101/30 (2023.01)

(52) U.S. Cl.
CPC ........ *G01C 21/3841* (2020.08); *B64C 39/024* (2013.01); *G01C 21/3815* (2020.08);
(Continued)

(58) Field of Classification Search
CPC ......... G06T 7/73; G06T 3/4038; G06T 5/006; G06T 17/05; G06K 9/6289;
(Continued)

(56) References Cited

U.S. PATENT DOCUMENTS 9,454,903 B2    9/2016 Sobue et al.
2015/0269438 A1    9/2015 Samarasekera et al.
(Continued)

FOREIGN PATENT DOCUMENTS

CN    105512628 A    4/2016
CN    106898249 A * 6/2017 ............. G05D 1/101
(Continued)

OTHER PUBLICATIONS

International Preliminary Report on Patentability, PCT App. No. PCT/CN2019/077504, dated Sep. 23, 2021, 5 pages.
(Continued)

Primary Examiner — Yuri Kan
(74) Attorney, Agent, or Firm — Xsensus LLP

(57) ABSTRACT

Techniques are disclosed for collaborative map construction using multiple vehicles. Such a system may include a ground vehicle including a first computing device and a first scanning sensor, and an aerial vehicle including a second computing device and a second scanning sensor. The ground vehicle can obtain a first real-time map based on first scanning data using the first scanning sensor, and transmit a first real-time map and position information to the aerial vehicle. The aerial vehicle can receive the first real-time map and the position information from the first computing device, obtain a second real-time map based on second scanning data collected using the second scanning sensor, and obtain a third real-time map based on the first real-time map and the second real-time map.

21 Claims, 14 Drawing Sheets

(52) U.S. Cl.
CPC ..... *G01C 21/3852* (2020.08); *G01C 21/3889* (2020.08); *B64U 2101/30* (2023.01)

(58) Field of Classification Search
CPC ............ G01C 21/1656; G01C 21/3852; G01C 21/3453; G06F 9/4806; H04N 5/265; G05D 1/0236; G05D 1/0011; G08B 13/1965; B64C 39/024; G08G 5/0086; H04L 47/82

See application file for complete search history.

(56) References Cited

U.S. PATENT DOCUMENTS

| | | |
|---|---|---|
| 2015/0312774 A1 | 10/2015 | Lau |
| 2016/0282864 A1 | 9/2016 | Lamm et al. |
| 2017/0021497 A1* | 1/2017 | Tseng ................... G05D 1/0236 |
| 2017/0131717 A1 | 5/2017 | Kugelmass |
| 2017/0236423 A1 | 8/2017 | Deane et al. |
| 2018/0075643 A1 | 3/2018 | Sequeira et al. |
| 2018/0120116 A1 | 5/2018 | Rombouts et al. |
| 2018/0150984 A1 | 5/2018 | Enke |
| 2018/0188044 A1 | 7/2018 | Wheeler |
| 2018/0365995 A1 | 12/2018 | Murray |
| 2019/0035099 A1 | 1/2019 | Ebrahimi Afrouzi et al. |
| 2019/0041225 A1* | 2/2019 | Winkle ............... G01C 21/3453 |
| 2019/0052852 A1* | 2/2019 | Schick ..................... G06T 5/006 |
| 2019/0220043 A1* | 7/2019 | Zamora Esquivel ......................... G05D 1/0011 |
| 2019/0238801 A1* | 8/2019 | Boyless ................. H04N 5/265 |
| 2019/0259170 A1* | 8/2019 | Qi .............................. G06T 7/73 |
| 2019/0266418 A1 | 8/2019 | Xu et al. |
| 2019/0324456 A1* | 10/2019 | Ryan ...................... G06F 9/4806 |
| 2019/0338666 A1* | 11/2019 | Finn ...................... G06T 3/4038 |
| 2019/0392242 A1 | 12/2019 | Tariq et al. |
| 2020/0309541 A1* | 10/2020 | Lavy .................. G01C 21/1656 |
| 2021/0132612 A1* | 5/2021 | Wang ................... G06K 9/6289 |
| 2022/0005332 A1* | 1/2022 | Metzler .............. G08B 13/1965 |

FOREIGN PATENT DOCUMENTS

| | | |
|---|---|---|
| CN | 106898249 A | 6/2017 |
| CN | 107479554 A | 12/2017 |
| CN | 108827306 A | 11/2018 |
| CN | 108832986 A | 11/2018 |
| CN | 109029417 A | 12/2018 |
| CN | 109029422 A | 12/2018 |
| EP | 0604404 A2 | 6/1994 |
| EP | 2 469 230 A1 | 6/2012 |
| EP | 3069995 A1 | 9/2016 |
| EP | 3399478 A1 | 11/2018 |
| FR | 2986647 A3 | 8/2013 |
| GB | 2559753 A | 8/2018 |
| WO | 91/09275 A2 | 6/1991 |
| WO | 2007/135659 A2 | 11/2007 |
| WO | 2015/165266 A1 | 11/2015 |
| WO | 2018/140191 A1 | 8/2018 |

OTHER PUBLICATIONS

Supplementary European search report and Search Opinion, EP App. No. 19820650.0, dated Feb. 17, 2022, 9 pages.
International Search Report and Written Opinion for related International Application No. PCT/CN2019/077504, dated Nov. 27, 2019, 9 pages.
European Search Report and Search Opinion, EP App. No. 19817925.1, dated Oct. 22, 2020, 9 pages.
International Search Report and Written Opinion for related International Application No. PCT/CN2019/077505, dated Jul. 19, 2019, 13 pages.
Non-Final Office Action, U.S. Appl. No. 17/097,362, dated Apr. 28, 2022, 44 pages.
Notice of Allowance, U.S. Appl. No. 17/097,362, dated Oct. 24, 2022, 11 pages.
Potena et al., "AgriColMap: Aerial-Ground Collaborative 3D Mapping for Precision Farming", IEEE Robotics and Automation Letters, vol. 4, No. 2, 2019, 8 pages.
Prankl et al., "RGB-D Object Modelling for Object Recognition and Tracking", 2015, IEEE/RSJ International Conference on Intelligent Robots and Systems (IROS), 978-1-4799-9994-1/15 (Year 2015).

\* cited by examiner

TECHNIQUES FOR COLLABORATIVE MAP CONSTRUCTION BETWEEN AN UNMANNED AERIAL VEHICLE AND A GROUND VEHICLE

CROSS REFERENCE TO RELATED APPLICATION

This application is a continuation application of International Application PCT/CN2019/077504, filed Mar. 8, 2019, entitled, "TECHNIQUES FOR COLLABORATIVE MAP CONSTRUCTION BETWEEN AN UNMANNED AERIAL VEHICLE AND A GROUND VEHICLE," which is related to International Application PCT/CN2019/077505, filed Mar. 8, 2019, entitled "TECHNIQUES FOR SHARING MAPPING DATA BETWEEN AN UNMANNED AERIAL VEHICLE AND A GROUND VEHICLE" each of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for mapping and object detection and, more particularly, but not exclusively, to collaborative map construction between an unmanned aerial vehicle and a ground vehicle.

BACKGROUND

Techniques are disclosed for collaborative map construction using multiple vehicles. Such a system may include a ground vehicle including a first computing device and a first scanning sensor, and an aerial vehicle including a second computing device and a second scanning sensor. The ground vehicle can obtain a first real-time map based on first scanning data using the first scanning sensor, and transmit a first real-time map and position information to the aerial vehicle. The aerial vehicle can receive the first real-time map and the position information from the first computing device, obtain a second real-time map based on second scanning data collected using the second scanning sensor, and obtain a third real-time map based on the first real-time map and the second real-time map.

SUMMARY

Techniques are disclosed for sharing sensor information between multiple vehicles. A system for sharing sensor information between multiple vehicles, can include an aerial vehicle including a first computing device and first scanning sensor, and a ground vehicle including a second computing device and second scanning. The aerial vehicle can use the first scanning sensor to obtain first scanning data and transmit the first scanning data to the second computing device. The ground vehicle can receive the first scanning data from the first computing device, obtain second scanning data from the second scanning sensor, identify an overlapping portion of the first scanning data and the second scanning data based on at least one reference object in the scanning data, and execute a navigation control command based on one or more roadway objects identified in the overlapping portion of the first scanning data and the second scanning data.

DETAILED DESCRIPTION

Figure 1:
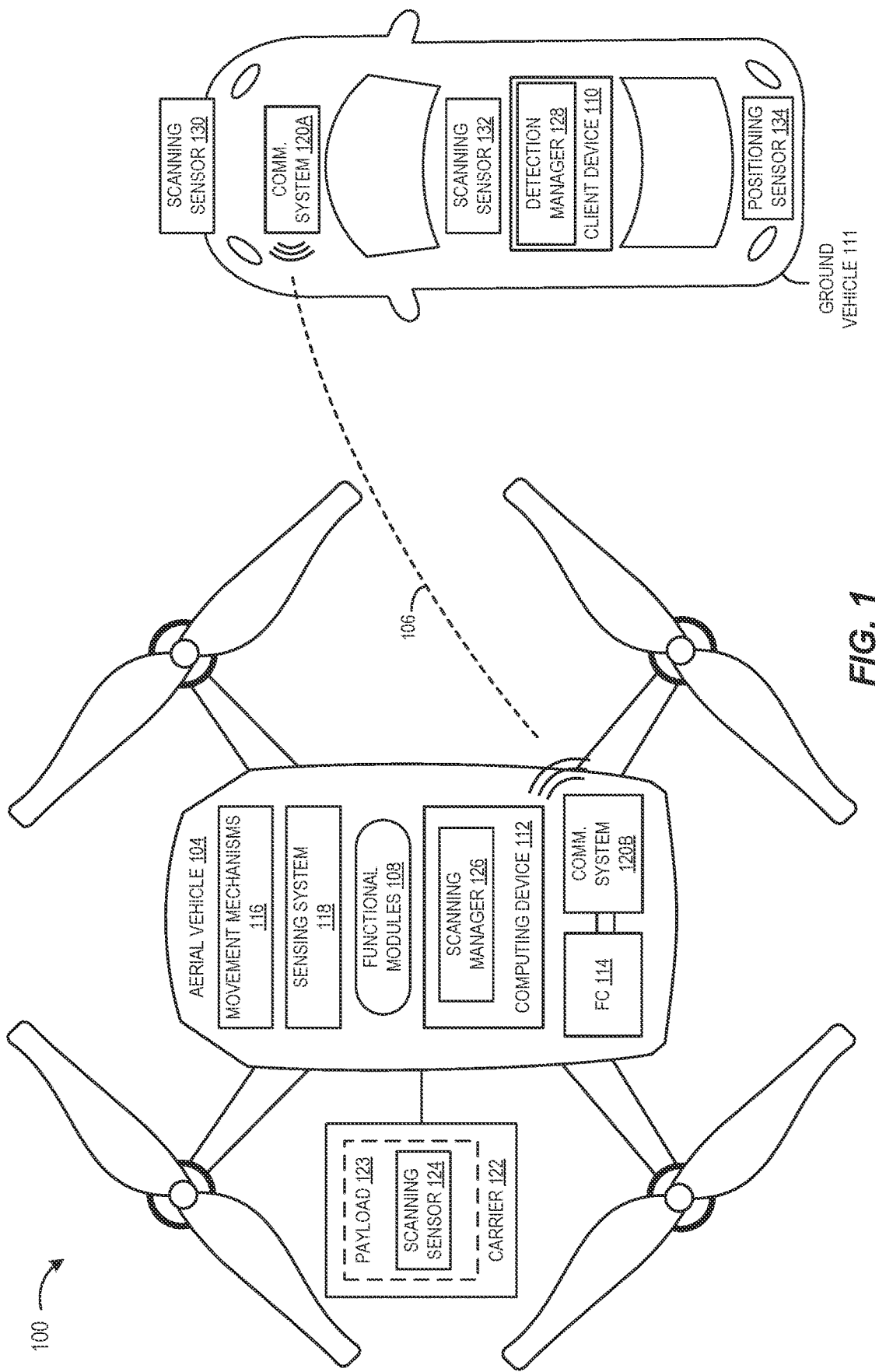
FIG. 1 illustrates an example of an aerial vehicle and a ground vehicle, in accordance with various embodiments.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes target mapping using a movable object. For simplicity of explanation, an unmanned aerial vehicle (UAV) is generally used as example of a movable object. It will be apparent to those skilled in the art that other types of movable objects can be used without limitation.

Self-driving techniques may include various sensing, determining and executing tasks, such as environment sensing, path planning, behavior determination and control execution. With respect to sensing, a self-driving vehicle can analyze its surrounding environment based on data gathered by one or more sensors mounted on the vehicle, including, e.g., visual sensors, LiDAR sensors, millimeter wave radar sensors, ultrasound sensors, etc. The sensor data can be analyzed using image processing tools, machine learning techniques, etc. to determine depth information and semantic information, to assist the vehicle in identifying surrounding people and objects. Additionally, LiDAR sensors provide accurate, longer distance measurements and positioning data for the vehicle.

Because the sensors are mounted to the vehicle, there are field of view and view angle limitations for the sensors. For example, when analyzing driving lanes, image data may be captured by a front-mounted camera, and the perspective of this image data may be transformed by projecting the front-view perspective of the image data to a birds-eye view image (e.g., an overhead perspective). This projection introduces distortions that lead to a loss of accuracy in the image data. Perspective effects lead to lane lines, and other object represented in the image data, to converge the farther they are from the imaging sensor. As such, there is a limit to the length of the environment in front of the vehicle that can be clearly recognized by a front mounted camera (or other imaging sensor). Therefore, the lane markings and other objects that are far away will normally be relatively blurry after the perspective transformation. Depending on the type of projection used to obtain the birds-eye view of the image data, the portions of the image representing objects farther away from the imaging sensor can become more distorted, making it difficult to reliably apply image processing techniques, such as Canny edge detection, binary image analysis, and other techniques to identify lane markings and other objects in the image data.

Additionally, the perspective transformation operation requires particular cameras to be effective, and even so the images must be prepared before they can be transformed. Further, the way the camera is installed on the vehicle and the current roadway conditions, such as the angle of the roadway, will have a significant effect on the reliability of the transformation and any analysis based on the transformed images. Also, techniques such as those used to obtain binary images require gradient and color threshold values that may not be generally applicable across most roadway conditions (e.g., weather conditions, roads that have fallen into disrepair, and other roadway conditions may reduce the visibility of some roadway objects, such as lane markings). All of this analysis also needs to be able to be performed quickly, however traditional techniques can process approximately 4.5 frames per second (FPS), while the number of frames of a vehicle mounted camera may be 30 FPS or above.

In some embodiments, as a car travels on a roadway it may use cameras to capture images of the roadway environment. These images may include representations of other nearby cars, trees, light poles, signs, and other nearby objects. In prior systems, these images may be transformed from a forward perspective view to an overhead view, which may then be used to generate a local map. However, because of how the camera mounted to the front of the car, the camera has a limited field of view. When these images are transformed to an overhead view, the transformation introduces inaccuracies, such as blurriness or other distortions. Also, the transformation itself requires additional time and processing resources, as discussed above. Due to the inaccuracies in the transformed images, the resulting maps generated based on these images are also less accurate and less useful. This also limits the usefulness and/or reliability of features that rely on these maps, such as lane detection and other assisted driving functions. Instead of relying only on transformed images, embodiments may use images captured by a drone, or other unmanned aerial vehicle (UAV), which can capture overhead images directly, without any transformation or the associated inaccuracies. The car can then generate a map using its own images and those collected by the drone, reducing or removing the potential inaccuracies introduced by transformation. Likewise, the map can be generated more efficiently without requiring the time or resources needed to transform the images.

Embodiments improve data collection and processing of environmental data by collecting data using an aerial vehicle and transmitting the data to a ground vehicle for use in object detection and other navigation tasks. For example, an aerial vehicle can capture a birds-eye view of the roadway environment and provide it to the ground vehicle for processing. Because the birds-eye view is obtained directly from aerial vehicle, no perspective transformation is required, and therefore the data does not have the distortions caused by perspective transformation. In various embodiments, a ground vehicle can use the scanning data (e.g., image data, point cloud data, etc.) captured by the aerial vehicle to perform autonomous driving and/or assisted driving functions. For example, the ground vehicle can perform lane detection using the scanning data received from the aerial vehicle. Lane detection may be performed as is generally known, such as through using, e.g., Canny edge detection to identify lane markings in the scanning data that indicate lane boundaries. Additionally, or alternatively, binary image analysis may be performed. A binary image can be obtained by utilizing gradient and color threshold values. Each pixel in the scanning data can be analyzed and, when the value of pixel is higher than the threshold value, that pixel can be set as 1 and when the pixel is lower than the threshold value, that pixel can be set to zero. A sliding window may be run on the resulting binary image, to calculate a polynomial curve to fit the lane represented in the binary image. Because the scanning data received from the aerial vehicle has not been transformed, and is therefore not distorted due to a perspective transformation, the lane detection performed on this scanning data provides more accurate lane detection results. Additionally, because the perspective transformation is not required, the image data can be processed more quickly.

FIG. 1 illustrates an example of a movable object in a movable object environment 100, in accordance with various embodiments. As shown in FIG. 1, client device 110 in a movable object environment 100 can communicate with a movable object 104 via a communication link 106. The movable object 104 can be an unmanned aircraft, an unmanned vehicle, a handheld device, and/or a robot. The client device 110 can be a portable personal computing device, a smart phone, a remote control, a wearable computer, a virtual reality/augmented reality system, a personal computer, and/or a computing device included in another vehicle (such as a ground vehicle 111, e.g., an autonomous vehicle, an unmanned vehicle, a manned vehicle, etc.). In some embodiments, the client device may be removable from the ground vehicle 111. For example, the client device may be a portable personal computing device (such as a smart phone, tablet, or other portable device), the user may attach the portable personal computing device to the ground vehicle via a wired or wireless communication interface, such as USB, Bluetooth, WiFi, or other interface. Additionally, the ground device 111 can include a communication system 120A, which is responsible for handling the communication between the client device 110 and the movable object 104 via communication system 120B. For example, an unmanned aircraft can include uplink and downlink. The uplink can be used for transmitting control signals, the down link can be used for transmitting media or video stream.

In accordance with various embodiments, the communication link 106 can be (part of) a network, which is based on various wireless technologies, such as the WiFi, Bluetooth, 3G/4G/5G, and other radio frequency technologies. Furthermore, the communication link 106 can be based on other computer network technologies, such as the internet technology, or any other wired or wireless networking technology. In some embodiments, the communication link 106 may be a non-network technology, including direct point-to-point connections such as universal serial bus (USB) or universal asynchronous receiver-transmitter (UART).

In various embodiments, movable object 104 in a movable object environment 100 can include a carrier 122 and a payload 123, such as scanning sensor 124. In some instances, the payload 123 may be provided on the movable object 104 without requiring the carrier. In various embodiments, the payload 123 may include one or more high bandwidth components, such as scanning sensor 124, one or more cameras, a stereo vision module, or other payload. The computing device 112 can connect to the flight controller 114 via UART and/or USB to send and receive data to and from the client device via communication system 120B. In various embodiments, the computing device 112 may include one or more CPUs, GPUs, field programmable gate arrays (FPGA), systems on chip (SoC), or other processor (s). In some embodiments, flight controller 114 and computing device 112 can be implemented as separate devices (e.g., separate processors on separate circuit boards). Alternatively, one or more of the flight controller 114 and computing device 112 can be implemented as a single device, such as an SoC. In various embodiments, computing device 112 may be removable from the movable object.

Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). As used herein, "aerial vehicle" may be used to refer to a subset of movable objects capable of flight (e.g., aircraft, UAVs, etc.), while "ground vehicle" may be used to refer to a subset of movable objects that travel on the ground (e.g., cars and trucks, both manually controlled by a driver and autonomously controlled).

In accordance with various embodiments, the movable object 104 may include one or more movement mechanisms 116 (e.g. propulsion mechanisms), a sensing system 118, and a communication system 120B. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 104 to hover in the air at a specified position and/or orientation. One or more of the movement mechanisms 116 may be controlled independently of the other movement mechanisms, for example by an application executing on client device 110, computing device 112, or other computing device in communication with the movement mechanisms. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally oriented rotors may spin in a counterclockwise direction. For example, the number of clockwise rotors may be equal to the number of counter-clockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation). As discussed further herein, a controller, such as flight controller 114, can send movement commands to the movement mechanisms 116 to control the movement of movable object 104. These movement commands may be based on and/or derived from instructions received from client device 110, computing device 112, or other entity.

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or imaging sensors (such as cameras). The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

Flight controller 114 can connect to various functional modules 108, such as a magnetometer, barometer, and inertial measurement unit (IMU). In some embodiments, communication system 120B can connect to computing device 112 instead of, or in addition to, flight controller 114. In some embodiments, sensor data collected by the one or more functional modules 108 and the sensing system 118 can be passed from the flight controller to the computing device 112. In some embodiments, the computing device 112 can connect to the scanning sensor 124 via a high bandwidth connection, such as ethernet or universal serial bus (USB). In some embodiments, sensing system may include a positioning sensor. The positioning sensor may include a radio, such as a 4G, 5G, or other cellular or mobile network radio. The radio may be used by a real-time kinematic (RTK) module to enhance positioning data collected by a global navigation satellite service (GNSS) module, such as GPS, GLOSNASS, Galileo, BeiDou, etc. The RTK module can receive a reference signal from a reference station using the radio and provide a correction to the positioning data provided by the GNSS module.

As shown in FIG. 1, ground vehicle 111 may also include one or more sensors coupled to client device 110. In some embodiments, these sensors may include a scanning sensor 130 and a scanning sensor 132. Scanning sensors 130 and 132 may include a LiDAR sensor, high definition imaging sensor (e.g., a still or video camera), or other sensor that provides high resolution scanning of a target environment. Scanning sensor 130 may be coupled to an upper position on ground vehicle 111, as shown in FIG. 1. Scanning sensor 130 is positioned to capture scanning data of the environment around the ground vehicle. For example, a LiDAR sensor can be configured to collect point cloud data representing a 360-degree view of the ambient environment of the vehicle. Similarly, a high definition imaging sensor can collect image data (e.g., still images and video) of the environment around the ground vehicle. Scanning sensor 132 may be coupled to the ground vehicle 111 at a forward position to capture scanning data of the environment directly in front of the ground vehicle. For example, scanning sensor 132 may collect scanning data related to the roadway environment in which the ground vehicle is operating (e.g., identify roadway objects (such as lane markings, other vehicles, trees and other objects present in the roadway environment), driving conditions (such as weather conditions), traffic information (including information related to nearby vehicles), roadway information (e.g., road type, surface condition, etc.)). In some embodiments, ground vehicle 111 may also include a positioning sensor 134. In some embodiments, the positioning sensor may include a global navigation satellite service (GNSS) module, such as GPS, GLOSNASS, Galileo, BeiDou, etc. The positioning sensor 134 may include a radio, such as a 4G, 5G, or other cellular or mobile network radio. The radio may be used by a real-time kinematic (RTK) module to enhance positioning data collected by the GNSS module. The RTK module can receive a reference signal from a reference station using the radio and provide a correction to the positioning data provided by the GNSS module.

The communication system 120B enables communication with client device 110 via communication link 106, which may include various wired and/or wireless technologies as discussed above, and communication system 120A. The communication system 120A or 120B may include any number of transmitters, receivers, and/or transceivers suitable for wireless communication. The communication may be one-way communication, such that data can be transmitted in only one direction. For example, one-way communication may involve only the movable object 104 transmitting data to the client device 110, or vice-versa. The data may be transmitted from one or more transmitters of the communication system 120A of the client device to one or more receivers of the communication system 120B of the movable object, or vice-versa. Alternatively, the communication may be two-way communication, such that data can be transmitted in both directions between the movable object 104 and the client device 110. The two-way communication can involve transmitting data from one or more transmitters of the communication system 120B to one or more receivers of the communication system 120A of the client device 110, and vice-versa.

In some embodiments, a client device 110 may communicate with a scanning manager 126 installed on computing device 112 over a transparent transmission channel of a communication link 106. The transparent transmission channel can be provided through the flight controller of the movable object which allows the data to pass through unchanged (e.g., "transparent") to the scanning manager or other application on computing device 112. In some embodiments, scanning manager 126 may utilize a software development kit (SDK), application programming interfaces (APIs), or other interfaces made available by the movable object, computing device, scanning sensor 124, etc. In various embodiments, the scanning manager may be implemented by one or more processors on movable object 104 (e.g., flight controller 114 or other processors), computing device 112, remote controller 111, client device 110, or other computing device in communication with movable object 104. In some embodiments, scanning manager 126 may be implemented as an application executing on client device 110, computing device 112, or other computing device in communication with movable object 104.

In some embodiments, an application executing on client device 110 or computing device 112 (such as detection manager 128 or scanning manager 126) can provide control data to one or more of the movable object 104, carrier 122, and payload 124 and receive information from one or more of the movable object 104, carrier 122, and payload 124 (e.g., position and/or motion information of the movable object, carrier or payload; data sensed by the payload such as image data captured by a payload camera; and data generated from image data captured by the payload camera). In some embodiments, the application may base the control data on scanning data received from scanning sensor 130 and/or scanning sensor 132.

In some embodiments, the control data may result in a modification of the location and/or orientation of the movable object (e.g., via control of the movement mechanisms 116), and/or a movement of the payload with respect to the movable object (e.g., via control of the carrier 122). The control data from the application may result in control of the payload, such as control of the operation of scanning sensor 124, a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors (e.g., of the sensing system 118 or of the scanning sensor 124 or other payload) and/or data generated based on the sensing information. The communications may include sensed information from one or more different types of sensors (e.g., GPS sensors, motion sensors, inertial sensor, proximity sensors, or imaging sensors). Such information may pertain to the position (e.g., location, orientation), movement, or acceleration of the movable object, carrier, and/or payload. Such information from a payload may include data captured by the payload or a sensed state of the payload.

In some embodiments, computing device 112 can be added to the movable object. The computing device can be powered by the movable object and can include one or more processors, such as CPUs, GPUs, field programmable gate arrays (FPGAs), system on chip (SoC), application-specific integrated circuit (ASIC), or other processors. The computing device can include an operating system (OS), such as Windows 10®, Linux®, Unix®-based operating systems, or other OS. Mission processing can be offloaded from the flight controller 114 to the computing device 112. In various embodiments, the scanning manager 126 can execute on the computing device 112, client device 110, payload 124, a remote server (not shown), or other computing device. In some embodiments, computing device 112 and client device 110 may be the same device.

As discussed, image data collected by scanning sensor 130 on the ground vehicle can be transformed into a birds-eye view using perspective transform techniques, such as using a homography. This leads to a distorted birds-eye view, which may lose details of various roadway objects, e.g., the parallelism of lane markings, blurred markings, etc., which may lead to errors in identifying the lane in which the ground vehicle 111 is traveling. Instead of relying on transforming a front-view image to a birds-eye view image, embodiments can utilize birds-eye view scanning data obtained from movable object 104. In some embodiments, scanning manager 126 can be used to collect scanning data from the roadway environment in which the ground vehicle 111 is operating. In some embodiments, the scanning data can include image data of the roadway in front of, or around, the ground vehicle 111. The scanning data may be collected at or near a location instructed by the client device 110 (e.g., satellite navigation system coordinates, a position relative to the ground vehicle, etc.). The image data can be transmitted by the scanning manager 126 to the detection manager 128 of the ground vehicle 111.

In some embodiments, the detection manager can obtain scanning data from scanning sensor 130. The scanning data from scanning sensor 130 may include front-view image data from front-mounted scanning sensor 130. In some embodiments, scanning sensor 130 may be mounted to ground vehicle 111 to capture rear-view image data, side-view image data, up-view image data, or image data in any suitable direction. The detection manager 128 can identify an overlapping portion of the scanning data received from the movable object and the ground vehicle using reference objects in the scanning data. The reference objects may include road signs, light poles, trees, or other identifiable objects in the roadway environment. In some embodiments, the reference object may be a coordinates in the roadway environment (e.g., GPS coordinates), which correspond to a point in the scanning data corresponding. These coordinates may represent correspond to any point viewable by both the ground vehicle and the aerial vehicle such as a point directly below movable object 104. Because the scanning data captured by the movable object does not include any transformation-related distortions, the scanning data may be used to perform lane detection to a longer distance in front of the ground vehicle 111, compared to the transformed forward perspective (e.g., front-view) scanning data. In some embodiments, the front-view image data can be transformed into an overhead view (e.g., birds-eye view) and an overlapping portion between the scanning data captured by the movable object and the transformed birds-eye view can be identified. The scanning data captured by the movable object can then be used to calibrate the transformed birds-eye view based on the overlapping portion. In various embodiments, scan matching techniques, feature matching, or other alignment techniques may be used to align the scanning data and identify the overlapping portion.

Figure 2A:
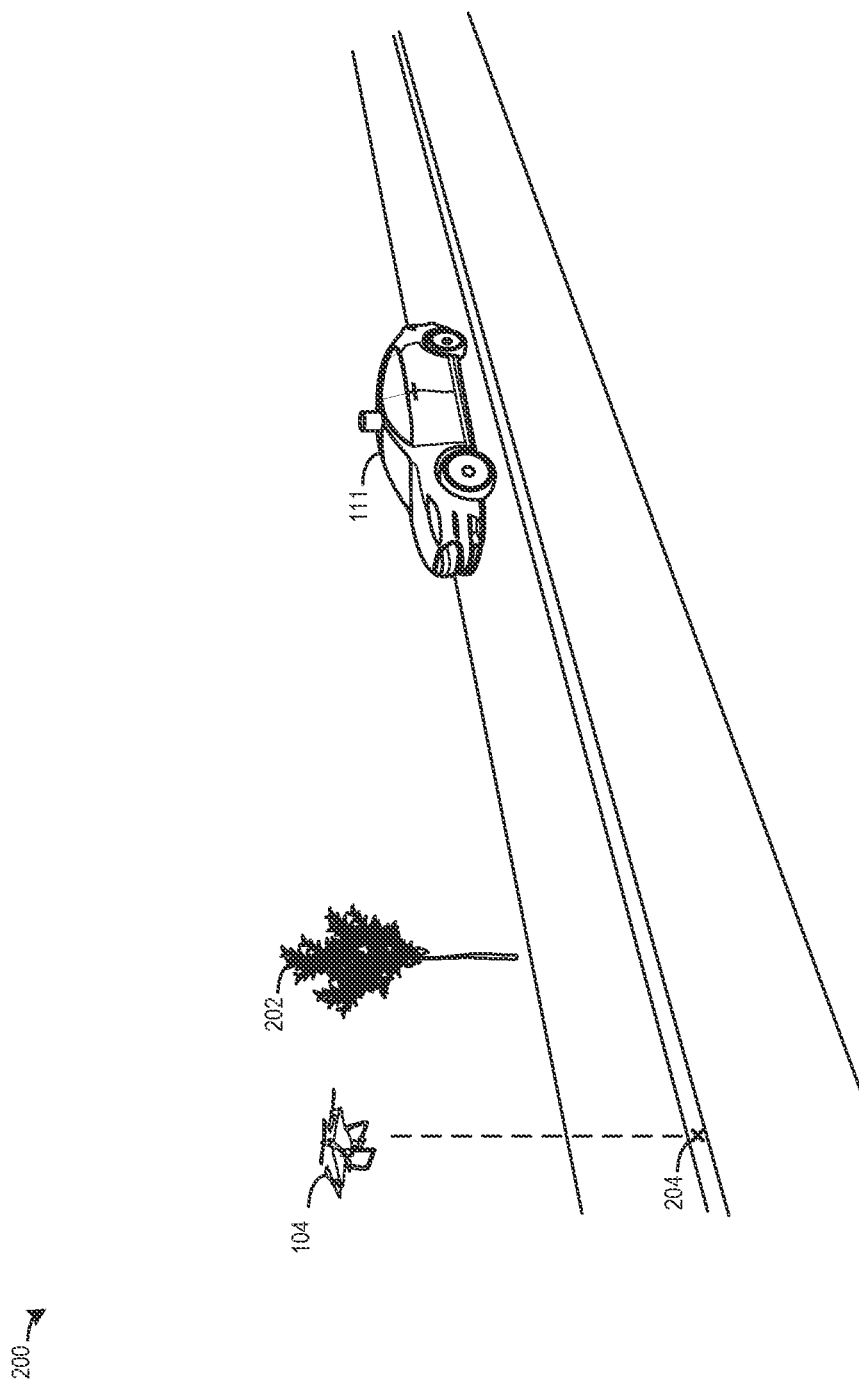
FIGS. 2A-2C illustrate an example of scanning data of a roadway environment obtained from an aerial vehicle and a ground vehicle, in accordance with various embodiments.
Figure 2B:
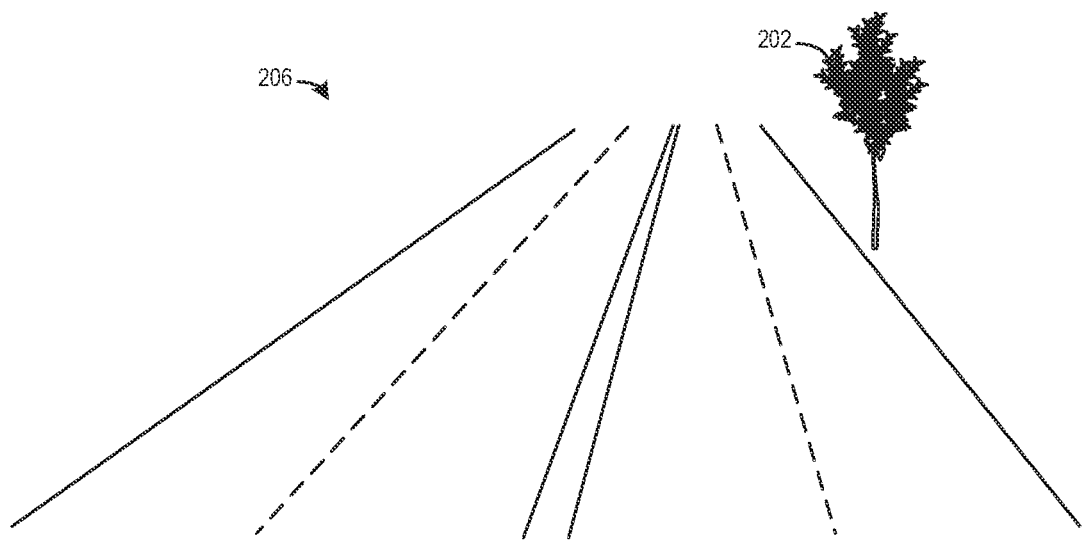
Figure 2C:
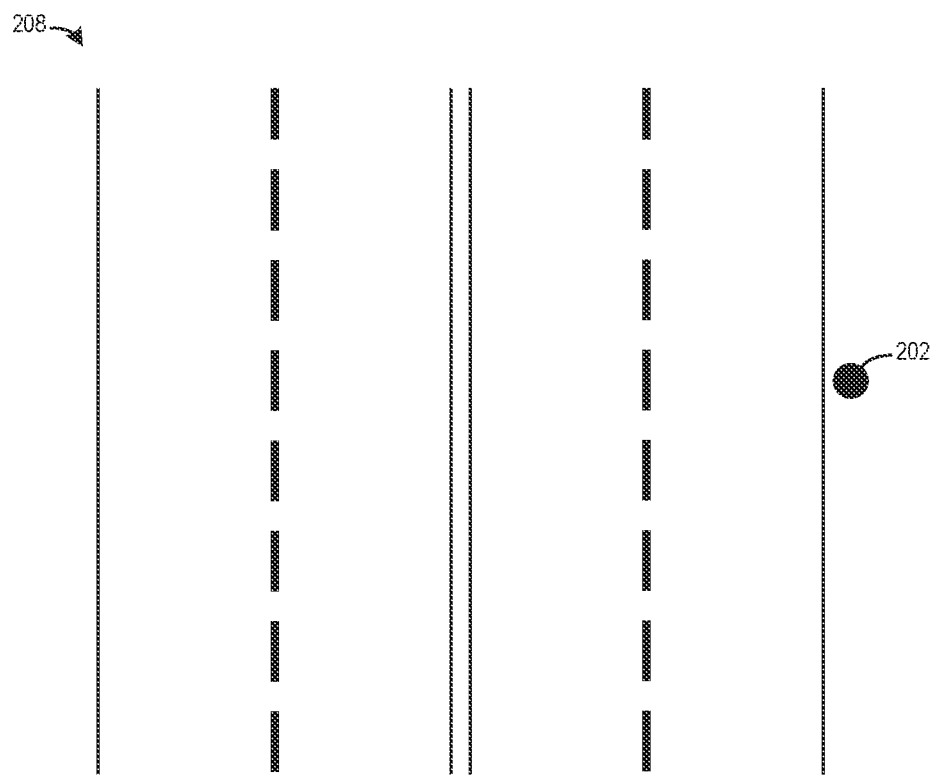

FIGS. 2A-2C illustrates an example of scanning data of a roadway environment obtained from an aerial vehicle and a ground vehicle, in accordance with various embodiments. As shown in FIG. 2A, the roadway environment 200 can include the ground vehicle driving on a roadway and an aerial vehicle flying above the roadway. As discussed, each vehicle can include one or more scanning sensors to collect scanning data from the roadway environment. One use of the scanning data is to perform various autonomous driving and/or assisted driving functions, such as lane detection.

As discussed, the scanning data captured by a scanning sensor on ground vehicle 111 can be captured from the vehicle-view angle, as shown in FIG. 2B at 206. As shown in FIG. 2B, the vehicle-view perspective results in the lanes converging. The vehicle view can be transformed into a birds-eye view using perspective transform techniques. However, this can lead to distortions of the scanning data. For example, depending on the perspective transform used, the portions of the roadway environment 200 farther from the scanning sensor of the ground vehicle can become blurry and may no longer appear parallel in the transformed scanning data. Depending on the lane detection technique used, these distortions may cause the lane to be misidentified. Likewise, other roadway objects, such as other vehicles, signs, environmental obstacles like trees, and other such objects may also be misidentified in the transformed image data.

However, in accordance with an embodiment, as shown at 208, a birds-eye view of the roadway environment 200 can be obtained directly from aerial vehicle 104. The scanning data obtained from the aerial vehicle does not require transformation to show the roadway environment from a birds-eye view. As such, the scanning data does not have the distortions caused by perspective transformation.

Accordingly, in various embodiments, the ground vehicle 111 can use the scanning data (e.g., image data, point cloud data, etc.) captured by the aerial vehicle 104 to perform autonomous driving and/or assisted driving functions. For example, the ground vehicle can perform lane detection using the scanning data received from the aerial vehicle. Lane detection may be performed as is generally known, such as through using, e.g., Canny edge detection to identify lane markings in the scanning data that indicate lane boundaries. Additionally, or alternatively, binary image analysis may be performed. A binary image can be obtained by utilizing gradient and color threshold values. Each pixel in the scanning data can be analyzed and, when the value of pixel is higher than the threshold value, that pixel can be set as 1 and when the pixel is lower than the threshold value, that pixel can be set to zero. A sliding window may be run on the resulting binary image, to calculate a polynomial curve to fit the lane represented in the binary image. Because the scanning data received from the aerial vehicle has not been transformed, and is therefore not distorted due to a perspective transformation, the lane detection performed on this scanning data provides more accurate lane detection results.

The scanning data received from the ground vehicle can be calibrated to make use of the more accurate lane detection information obtained from analyzing the scanning data received from the aerial vehicle. For example, as shown in FIGS. 2A-2C, a reference object 202 observable to both the aerial vehicle and ground vehicle can be chosen to perform calibration. The reference object 202 can be a physical object in the roadway environment, such as a tree (as shown), road sign, pole, or fixed roadway object. Additionally, or alternatively, the reference object 202 can be a point 204 in the roadway environment (e.g., particular GPS coordinates). For example, as shown in FIG. 2A, the reference object can be a point 204 (e.g., a global position or a position relative to the ground vehicle or aerial vehicle) which is directly below the aerial vehicle.

As shown in FIG. 2B, reference object 202 can be identified in the vehicle scanning data. The reference object can be associated with a coordinate in the scanning data (e.g., an image coordinate system based on pixels). For example, the example front-view shown in FIG. 2B is a projection of the roadway environment 200 onto a two-dimensional image plane. Using the intrinsic parameters (e.g., focal length, lens parameters, etc.) and extrinsic parameters (e.g., position, orientation, etc.) of the scanning sensor of the ground vehicle, a projection matrix can be used to convert from the image coordinate system of then two-dimensional image plane to the world coordinate system of the three-dimensional roadway environment. Similarly, a perspective transformation can be used to convert from the front-view image plane to a birds-eye image plane. These transformations allow positions in the transformed birds-eye view to be mapped to the front-view and to the roadway environment 200. For a physical reference object, the pixels representing the reference object in the scanning data can be identified. In some embodiments, image processing techniques and/or machine learning techniques, such as object recognition, may be used to identify the reference object in the scanning data. The pixels representing the reference object in the scanning data can be mapped to the transformed birds-eye view based on the scanning data.

As discussed, the reference object can be a position directly under the aerial vehicle, or other point, in the roadway environment. The aerial vehicle can determine its position using a positioning sensor, such as a global navigation satellite service (GNSS) sensor, e.g., GPS, BeiDou, etc. The position of the reference object can be the position of the aerial vehicle with the elevation value zeroed out (or set to another value, such as the elevation value of the ground vehicle). In some embodiments, the aerial vehicle can provide its position to the ground vehicle. In some embodiments, the ground vehicle can identify the position of the aerial vehicle relative to the position of the ground vehicle using one or more sensors coupled to the ground vehicle. The sensors may include an infrared range finder, ultrasonic rangefinder, radar sensor, LiDAR sensor, etc. The ground vehicle can use the sensor data to determine the location of the aerial vehicle relative to the ground vehicle. The ground vehicle can include a GNSS sensor used to determine the current position of the ground vehicle. Using its current position and the relative position of the aerial vehicle, the ground vehicle can determine a position of the aerial vehicle in the world coordinate system of the roadway environment. As discussed, the ground vehicle can convert a position in the world coordinate system to the image coordinate system of the front-view image 206. Once converted to the image coordinate system, the ground vehicle can map the position from the image coordinate system to the transformed birds-eye view coordinate system.

In some embodiments, when the aerial vehicle transmits its birds-eye view 208, the ground vehicle can identify an overlapping portion of the birds-eye view 208 captured by the aerial vehicle and the transformed birds-eye view based on the front-view 206 captured by the ground vehicle. For example, the position of the reference object in both images can be used to align the two images and/or to map the aerial vehicle's scanning data to the ground vehicle's scanning data. In some embodiments, the aerial vehicle may provide scanning data that extends farther in front of the ground vehicle than the ground vehicle's scanning data shows. The ground vehicle can therefore extend its view of the roadway environment using the scanning data from the aerial vehicle, aligned using the reference object.

In some embodiments, the ground vehicle 111 can instruct the aerial vehicle to capture scanning data at or near particular positions in the roadway environment, using either absolute coordinates (e.g., using global navigation satellite service coordinates) or a position relative to the ground vehicle. For example, the ground vehicle can send control data to the aerial vehicle with a position 100 meters ahead of the ground vehicle. The aerial vehicle can process the control data and the aerial vehicle can generate movement commands that are send to the movement mechanisms 116 of the aerial vehicle which causes the aerial vehicle to travel to the instructed position. The aerial vehicle can then capture scanning data at the instructed position and transmit the scanning data to the ground vehicle for further processing.

Figure 3:
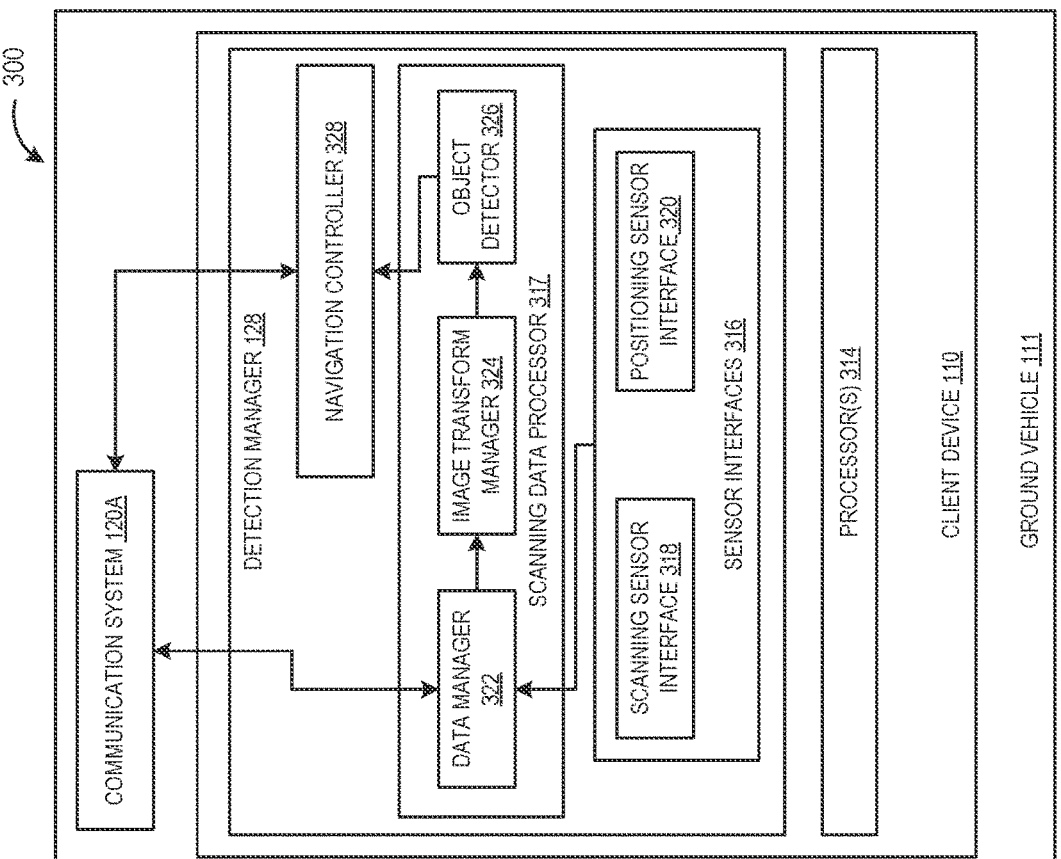
FIG. 3 illustrates an example of a scanning manager and a detection manager, in accordance with various embodiments.
Figure 3:
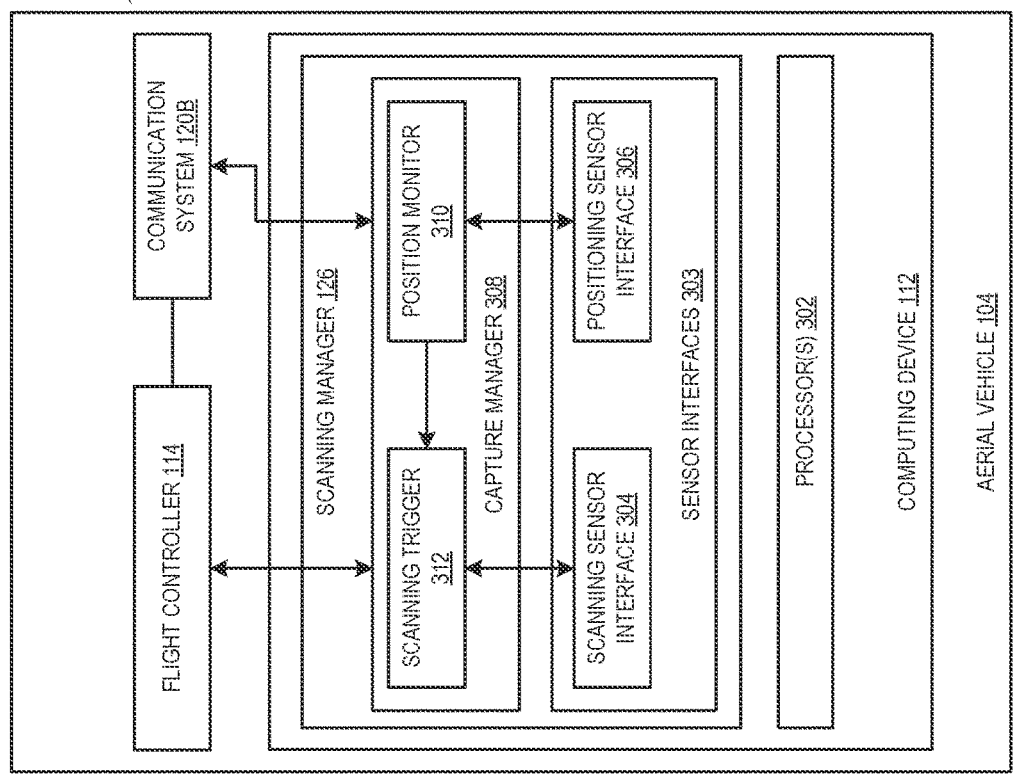

FIG. 3 illustrates an example 300 of a scanning manager and a detection manager, in accordance with various embodiments. As shown in FIG. 3, a scanning manager 126 may execute on one or more processors 302 of computing device 112. The one or more processors 302 may include CPUs, GPUs, FGPAs, SoCs, or other processors. The scanning manager 126 may include sensor interfaces 303 and capture manager 308.

Sensor interfaces 303 can include a scanning sensor interface 304 and a positioning sensor interface 306. The sensor interfaces 303 may include hardware and/or software interfaces. The scanning sensor interface 304 can receive data from the scanning sensor (e.g., an imaging device, a LiDAR sensor, or other scanning sensor) and the positioning sensor interface 306 can receive data from a positioning sensor (e.g., a GNSS sensor, RTK sensor, etc.). In various embodiments, the scanning sensor may produce data in a point cloud format. The point cloud data may be a three-dimensional representation of the target environment. In some embodiments, the point cloud data may be converted to a matrix representation. In some embodiments, the scanning sensor may produce image data, such as high definition images and/or video of the roadway environment in which the aerial vehicle is traveling. The positioning data may include GPS coordinates for the aerial vehicle.

In some embodiments, control data can be received from client device 110 instructing the aerial vehicle to move to a particular position. The control data can be received via communication system 120B and sent directly to flight controller 114 to be used to generate movement commands to cause the aerial vehicle to move to the instructed position. In some embodiments, the control data, or at least the instructed position, may be passed to the capture manager 308 by the communication system 120B or flight controller 114. The capture manager 308 can include a position monitor 310 which monitors a current position of the aerial vehicle based on position information received through positioning sensor interface 306. Position monitor 310 can further compare the instructed position to the current position of the aerial vehicle. For example, position monitor may implement hardware or software logic to compare two input values (e.g., current coordinates of the aerial vehicle and target coordinates of the aerial vehicle) and output a binary value indicating whether the two input values match. If the two input values match, a signal can be sent to scanning trigger 312 which may then send an instruction to the scanning sensor via scanning sensor interface 304 to cause the scanning sensor to capture scanning data of the roadway environment. As discussed, this may include image data captured using an imaging device and/or point cloud data captured using a LiDAR sensor, and/or other scanning data of the roadway environment. Once the scanning data has been captured, the scanning data can be transmitted to the client device 110 for further processing.

Client device 110 may include a detection manager 128 executing on one or more processors 314. The one or more processors 314 may include CPUs, GPUs, FGPAs, SoCs, or other processors. The detection manager 128 may include sensor interfaces 316 and scanning data processor 317. The sensor interfaces can include hardware or software interfaces that facilitate communication of data and/or commands between the detection manager 128 and various scanning sensors and positioning sensors coupled to ground vehicle 111. Scanning data processor 317 can include a data manager 322 that receives scanning data from scanning manager 126 via communication system 120A, and from onboard scanning sensors coupled to ground vehicle 111 via scanning sensor interface 318. The scanning data from scanning manager 126 may include positioning data representing a position of the aerial vehicle when the scanning data was captured. In some embodiments, the data manager 322 may further collect position data from the positioning sensors onboard the ground vehicle via positioning sensor interface 320.

Data manager 322 can associate the scanning data received from the scanning manager with the scanning data received from the ground vehicle. For example, pairs of scanning data may be timestamped to be associated with one another by the data manager. The associated data may be passed to an image transform manager 324. As discussed, image transform manager can implement perspective transformation techniques to convert the front-view scanning data collected by the ground vehicle to a birds-eye view. The image transform manager 324 can identify an overlapping portion of the scanning data captured by the aerial vehicle and the transformed birds-eye view based on the front-view scanning data captured by the ground vehicle. For example, the position of a reference object in both images can be used to align the two images and/or to map the aerial vehicle's scanning data to the ground vehicle's scanning data, as discussed above. In some embodiments, matching can be performed between the scanning data captured by the aerial vehicle and the front-view scanning data captured by the ground vehicle. If the data matches, and/or if an overlap is identified, then data does not need to be transformed before being matched with the overhead image. If they do match, then the aerial scanning data can be used instead of transforming the front-view scanning data. Alternatively, in some embodiments, the front-view scanning data may be transformed to an overhead view, and the aerial scanning data may be used to calibrate the transformed overhead view (e.g., to correct for distortions).

Once the scanning data received from the aerial vehicle has been matched with the transformed scanning data of the ground vehicle, the scanning data from the aerial vehicle can be passed to object detector 326. Object detector 326 may implement various object detection techniques, such as an object detection machine learning model trained to identify roadway objects in the scanning data and/or edge detection techniques used to identify roadway objects such as lane markings. When roadway objects are identified in the scanning data received from the aerial vehicle, the positions of the objects can be mapped to their corresponding positions in the scanning data captured by the ground vehicle. In some embodiments, navigation commands can be generated based on the object identified in the scanning data. For example, when a lane is detected in the scanning data, a polynomial curve can be calculated that fits the detected lane in the scanning data. The polynomial curve can be used to determine a trajectory for the ground vehicle to follow to stay within the lane. This can be provided to navigation controller 328 which can generate movement commands for the ground vehicle.

In some embodiments, object detector 326 may determine that the collected scanning data provides insufficient range ahead of the ground vehicle to identify objects in enough time to determine appropriate navigation commands. For example, weather conditions may limit visibility, or the roadway ahead may be winding, limiting the effective range of the scanning sensors of the ground vehicle. In some embodiments, the object detector may include a machine learning model trained to determine an optimal scanning range (e.g., distance in front of the ground vehicle) at which to collect scanning data. The model may be trained based on roadway conditions (weather, traffic, etc.) and/or driving conditions (current speed, direction, etc.). In some embodiments, the model may be trained on past navigation data for the current location of the ground vehicle collected by other ground vehicles that have traveled in the area. When the object detector determines that a different scanning range is needed, the object detector can send a request to the navigation controller 328 to instruct the aerial vehicle to move to a new position to capture scanning data at the new scanning range. The navigation controller 328 can send control data to the aerial vehicle via communication system 120A, and in response the aerial vehicle may reposition itself to the instructed position.

Although embodiments are discussed with respect to an aerial vehicle-ground vehicle pair, in various embodiments, one aerial vehicle may provide scanning data to a plurality of ground vehicles. Additionally, in some embodiments, a plurality of aerial vehicles may be in communication with the ground vehicle, with each aerial vehicle capturing scanning data at a different position and transmitting the scanning data to the ground vehicle. The ground vehicle can use the scanning data to construct a local map around the ground vehicle (e.g., using Simultaneous Localization and Mapping (SLAM) techniques). In some embodiments, the aerial vehicle may be stored in the ground vehicle. For example, the ground vehicle may include a platform from which the aerial vehicle may launch from and land on. The ground vehicle may, for example, determine that current driving conditions require additional scanning data and can launch the aerial vehicle to collect it. When conditions improve, or when the aerial vehicle requires additional charging, the aerial vehicle can return to the ground vehicle for charging and storage.

Figure 4:
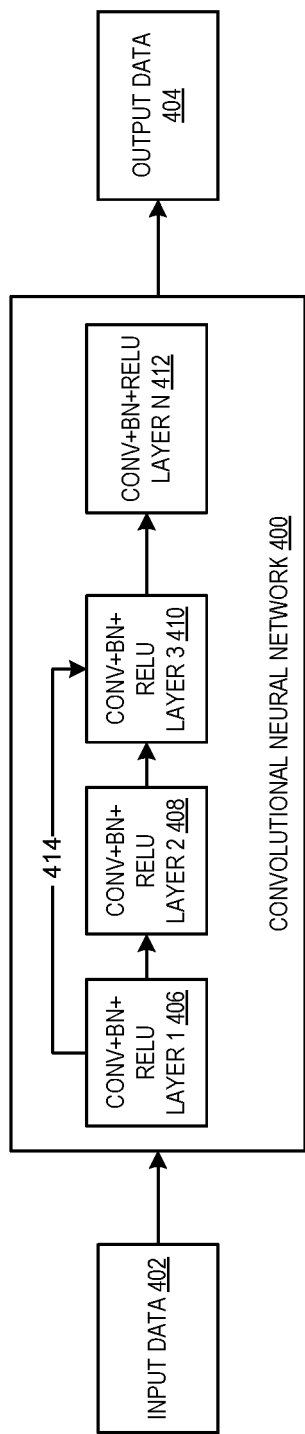
FIG. 4 illustrates an example of a machine learning model for use in roadway object detection, in accordance with various embodiments.

FIG. 4 illustrates an example of a machine learning model for use in roadway object detection, in accordance with various embodiments. As discussed, in various embodiments, scanning data can be obtained by the aerial vehicle and the ground vehicle. The front-view scanning data obtained by the ground vehicle can be transformed into an intermediate format (e.g., a birds-eye view) which enables the scanning data captured by the ground vehicle to be calibrated using the birds-eye view scanning data captured by the aerial vehicle. Calibration may include both aligning the intermediate format with the scanning data captured by the aerial vehicle (e.g., based on the position of one or more reference objects in both sets of data) as well as augmentation of the intermediate format (e.g., adding corresponding depth information included in the scanning data obtained by the aerial vehicle to the overlapping portion of the intermediate format). In various embodiments, the intermediate format can be provided as input to a machine learning model to perform object detection, pattern recognition, or other inference on the scanning data.

In some embodiments, each image obtained by the aerial vehicle is matched with the intermediate format at the pixel level (e.g., where at least a portion of the scanning data obtained by the aerial vehicle and the ground vehicle overlaps). A machine learning model, such as convolutional neural network (CNN) 400, can be trained to identify semantic information associated with each pixel, or patch of pixels, in the intermediate format. For example, a training dataset may be maintained that includes ground truth labels (e.g., lane marking, road, vehicle, traffic barrier, etc.). The CNN 400 can be trained on the training dataset until the output of the CNN is within a threshold confidence of the ground truth labels. In some embodiments, the input to the CNN can be represented as N*4*H*W, where N corresponds to the number of input patches in the input image data, 4 corresponds to the number of channels in the input image data (e.g., each pixel may include R+G+B+depth values), H corresponds to the height of the input image data, and W corresponds to the width of the input image data. In some embodiments, depth can correspond to the depth of field measured by the aerial vehicle which has been added to the intermediate format. In some embodiments, CNN 400 may include a plurality of layers 406-412, with each layer including a convolution layer (CONV), a batch normalization layer (BN), and an activation function layer (RELU). In some embodiments, the CNN 400 may implement a skip connection architecture, in which some data output by one layer can be provided to the next layer and can be provided to a further layer, as depicted at 414. This allows some data that might otherwise be abstracted away to be retained for use by other layers in the CNN. Although one particular architecture is depicted in FIG. 4, various machine learning models may be used in accordance with an embodiment.

When performing inference, the input image data 402 (e.g., the transformed and calibrated intermediate format representing the birds-eye view of the roadway environment) can be provided to the trained CNN 400. The CNN 400 can analyze the input image data 402 and provide an output 404 which may be represented as N*K*H*W, wherein for the N*W pixels of the input N patches, the semantic information of K channels is output. The output value of each channel represents the probability of the semantic information of the channel. For example, for a certain pixel, the output may be lane marking 80%, road 13%, vehicle 1%. As a result, the content of each pixel in the input image data can be characterized. This allows, e.g., each pixel of the input image showing a lane marking to be identified. A curve can then be fit to those pixels to identify the current lane in which the vehicle is traveling. The ground vehicle can then reverse the projection from the intermediate format to the front-view and map those pixels that include lane markings to the front view. The resulting curve can be used to generate movement commands that cause the ground vehicle to follow a trajectory that keeps the ground vehicle in the lane.

As discussed above, in some embodiments, a reference object depicted in the scanning data of both the aerial vehicle and the ground vehicle can be used to calibrate the scanning data of the ground vehicle. To account for differences in lighting between the two perspectives, various techniques, such as Zero Mean Normalized Cross-Correlation (ZNCC), semi-global matching (SGM), and sweeping may be used to compensate for radiometric variations between the input scanning data. In some embodiments, k-means clustering, or other clustering techniques can be used to quickly identify features in the scanning data. The features can be assigned a weight based on likely importance. In some embodiments, calibration can be performed using the position of the reference object in the scanning data. The pixel or pixels corresponding to the reference object can be assigned a label indicating they are associated with the reference object. This provides pixel level calibration to the scanning data.

As discussed, in some embodiments, the scanning data may include point cloud data. The point cloud data may be a three-dimensional representation of the target environment (e.g., the roadway environment). This 3D representation can be divided into voxels (e.g., 3D pixels). Each point in the point cloud of the mapping data is associated with a position in the scanner reference frame that is determined relative to the scanning sensor. The positioning data of the movable object, produced by the positioning sensor, may then be used to convert this position in the scanner reference frame to the output reference frame in a world coordinate system. In some embodiments, the scanning data may be encoded before it is transmitted from the aerial vehicle to the ground vehicle. For example, the scanning data obtained by the scanning sensor on the aerial vehicle may be a dense representation, which may be transformed into a sparse representation prior to transmitting to the ground vehicle. In some embodiments, the difference between each frame of the scanning data may be transmitted, rather than the entire frame of scanning data. In some embodiments, the point cloud data obtained by the aerial vehicle can be used to augment the point cloud data obtained by the ground vehicle. For example, the X and Y components of the point-cloud for objects that are far away from the ground vehicle can be captured more accurately by the aerial vehicle. This data can be shared with the ground vehicle, improving the accuracy of the calculation of the ground vehicle mounted three dimensional point-cloud.

In some embodiments, the aerial vehicle and the ground vehicle may each be configured to map the roadway environment using Simultaneous Localization and Mapping (SLAM) techniques to generate a local map. The SLAM techniques may use data captured by the scanning sensors and/or various other sensors, such as an IMU, a gyroscope, or other suitable sensors. The SLAM generated by the aerial vehicle can be transmitted to the ground vehicle and combined with the SLAM generated by the ground vehicle to extend the local map generated by the ground vehicle. In some embodiments, traffic conditions (e.g., weather conditions, traffic density, etc.) may limit the ability of the ground vehicle to generate a map using SLAM techniques. When such traffic conditions are detected, the ground vehicle can instruct the aerial vehicle to capture birds-eye view visual data to complete the local map generated by the ground vehicle.

Figure 5:
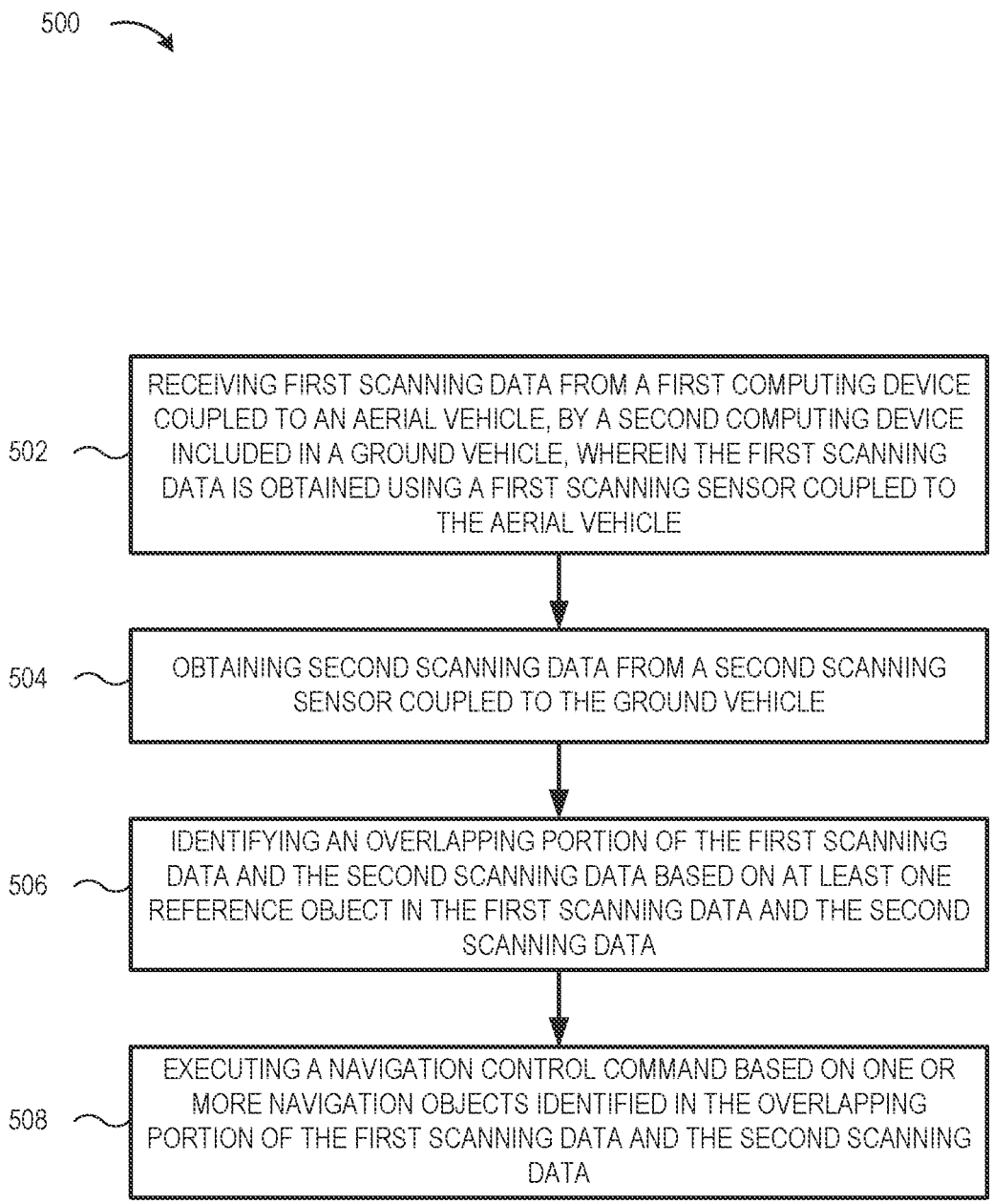
FIG. 5 shows a flowchart of a method of sharing sensor information between multiple vehicles in a movable object environment, in accordance with various embodiments.

FIG. 5 shows a flowchart of a method of sharing sensor information between multiple vehicles in a movable object environment, in accordance with various embodiments. At 502, first scanning data can be received from a first computing device coupled to an aerial vehicle, by a second computing device included in a ground vehicle. The first scanning data is obtained using a first scanning sensor coupled to the aerial vehicle. In some embodiments, the first scanning data includes first mapping data generated based on point cloud data collected by the first scanning sensor.

At 504, obtaining second scanning data from a second scanning sensor coupled to the ground vehicle. In some embodiments, the first scanning data can be received by a plurality of ground vehicles in communication with the aerial vehicle. In some embodiments, scanning data can be obtained by a plurality of aerial vehicles in communication with the ground vehicle, and the scanning data can be transmitted by the plurality of aerial vehicles to the ground vehicle. In some embodiments, the first scanning sensor includes a first LiDAR sensor and the second scanning sensor includes a second LiDAR sensor. In some embodiments, the second scanning data includes second mapping data generated based on point cloud data collected by the second scanning sensor. In some embodiments, the first mapping data can be combined with the second mapping data to increase a coverage area of a local map maintained by the ground vehicle.

At 506, an overlapping portion of the first scanning data and the second scanning data can be identified based on at least one reference object in the first scanning data and the second scanning data. In some embodiments, the at least one reference object includes a representation of a roadway object represented in the first scanning data and the second scanning data.

At 508, a navigation control command can be executed based on one or more navigation objects identified in the overlapping portion of the first scanning data and the second scanning data. In some embodiments, the one or more navigation objects include a driving lane represented in the overlapping portion of the first scanning data and the second scanning data.

In some embodiments, the method may further include receiving a movement command from the second computing device on the ground vehicle, the movement command including a location, causing the aerial vehicle to move to the location, and obtaining the first scanning data at or near the location. In some embodiments, the location includes at least one of location coordinates, a position relative to the ground vehicle or other object.

In some embodiments, the method may further include, transforming the first scanning data and the second scanning data into an intermediate format, performing object recognition on the intermediate format using a machine learning model to identify the one or more navigation objects, the machine learning model trained to identify the one or more navigation objects, and determining the navigation control command based on the object recognition. In some embodiments, an input to the machine learning model includes a plurality of input patches from the intermediate format, a number of channels, and a height and width of the input patches, the number of channels representing color and depth associated with each input patch. An output of the machine learning model includes one or more confidence scores for each input patch, the one or more confidence scores associated with the one or more navigation objects.

In some embodiments, the method may further include detecting a traffic condition affecting the ground vehicle, and in response to the detected traffic condition, sending a command to the first computing device on the aerial vehicle to collect the first mapping data.

Unmanned aerial vehicles (UAVs) carry computing devices and sensors which enable UAVs to implement Simultaneous Localization and Mapping (SLAM) to map their environment. A UAV can scan its environment using scanning sensors such as imaging sensors, LiDAR sensors, etc., while flying and construct a localization mapping for itself to plan a route. The resulting map may also be used for obstacle avoidance and auto-piloting. However, UAVs are still limited in the quantity and sophistication of the computing devices, sensors, batteries, etc., that they can carry, which results in reduced capability to use SLAM techniques to generate large, accurate maps. Additionally, while collecting data to perform SLAM, the aerial vehicle is subject to wind, user-initiated movements, and other instabilities which can limit the accuracy of the data collected. Additionally, some UAVs may move too quickly for an accurate SLAM to be used for navigation.

SLAM techniques provide a way of construction and/or updating a real-time map of the environment in which a movable object is operating and simultaneously maintaining a position of the moveable object within the real-time map. deals with a computational problem of constructing or updating a map of an unfamiliar environment while simultaneously keeping track of an agent's local with it. A typical SLAM deals with constructing stereoscopic frames and connecting the frames to form a continuous map. SLAM may be performed using imaging sensors, such as monocular or binocular cameras, LiDAR sensors, or other scanning sensors.

Drones and other unmanned aerial vehicles (UAV) are limited in quantity and quality of sensors and computers they may carry. This can be due to the costs of such equipment, weight restrictions, power restrictions, etc. Cars and other ground vehicles, however, are not nearly as restricted in their capacity to carry sophisticated computers and sensors). A car provides a more protected and stable platform to carry expensive equipment, and any additional weight or power requirements are generally easily accommodated. As a car drives along a roadway, it can use its onboard sensors to generate a high precision local map. The car may use cameras, LiDAR, inertial measurement units, gyroscopes, and other sensors to generate the high precision map. The car can transmit the resulting high precision map to a drone flying near the car. The drone can also generate a map based on its onboard sensors as it flies nearby. However, this is a lower precision map, due to the types of sensors carried by the drone, and the computing resources available to the drone. However, the drone can combine its map with the high precision map received from the car to obtain a high precision map it can use to navigate through its environment (for example to avoid object, generate routes, etc. Embodiments take advantage of the higher quality sensors and computers available in a car or other ground vehicle to improve the maps available to a drone or other UAV.

Embodiments provide a map construction method that can use data collected by a ground vehicle, as well as computing devices and sensors available to the ground vehicle, to generate a more comprehensive and accurate map than the UAV is capable of generating on its own. The UAV can share data it collects an as well as any maps constructed using SLAM techniques with the ground vehicle. The ground vehicle can combine its own map with that of the UAV to generate a combined map that may be shared with the UAV. The combined map may include more details and cover a larger area than the map generated by the UAV alone. The combined map may then be transmitted to the UAV for use in navigation, tailing and obstacle avoidance.

Figure 6:
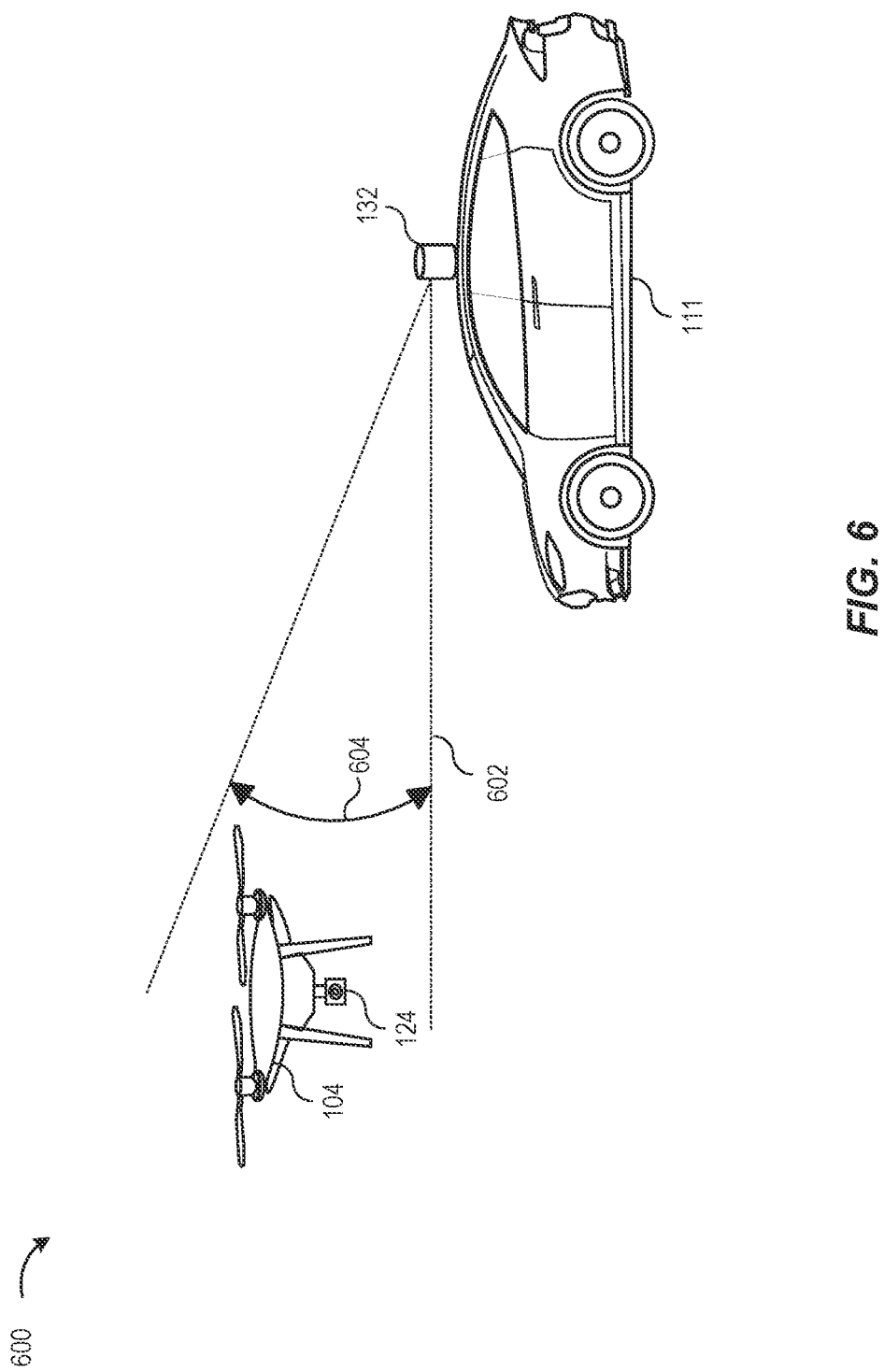
FIG. 6 illustrates an example of an aerial vehicle and a ground vehicle, in accordance with various embodiments.

FIG. 6 illustrates an example 600 of an aerial vehicle and a ground vehicle, in accordance with various embodiments. As discussed above, a ground vehicle 111 may include one or more scanning sensors 132, such as a LiDAR sensor. The ground vehicle's scanning sensors may have a sensing range 602, 604 in which it can detect its environment. An aerial vehicle, 104, may also include one or more scanning sensors 124, with which it can scan its environment. As discussed above, the aerial vehicle 104 and ground vehicle 111 may both include various sensors, computing devices, movement mechanisms, and controllers which enable the aerial vehicle and ground vehicle to navigate their environment.

Using its scanning sensors 132, the ground vehicle can obtain a position of the aerial vehicle so long as it is operating within range of the ground vehicle's sensors. The position may be relative to the ground vehicle or may be an absolute position in the world coordinate system or other coordinate system. Both the aerial vehicle 104 and the ground vehicle 111 can use their respective sensors to perform SLAM of the environment in which they are operating. As discussed further, the ground vehicle can perform SLAM using improved sensors and computing devices when compared to those available to the aerial vehicle. The ground vehicle can therefore generate a more accurate SLAM compared to the aerial vehicle and provide the map to the aerial vehicle for use in navigation. In some embodiments, the aerial vehicle may also map the environment using SLAM techniques, which may result in a lower precision map compared to that produced by the ground vehicle. The aerial vehicle can transmit its map to the ground vehicle, which may then combine the aerial vehicle's map with that generated by the ground vehicle, and return the higher precision combined map to the aerial vehicle for use in navigation.

Figure 7:
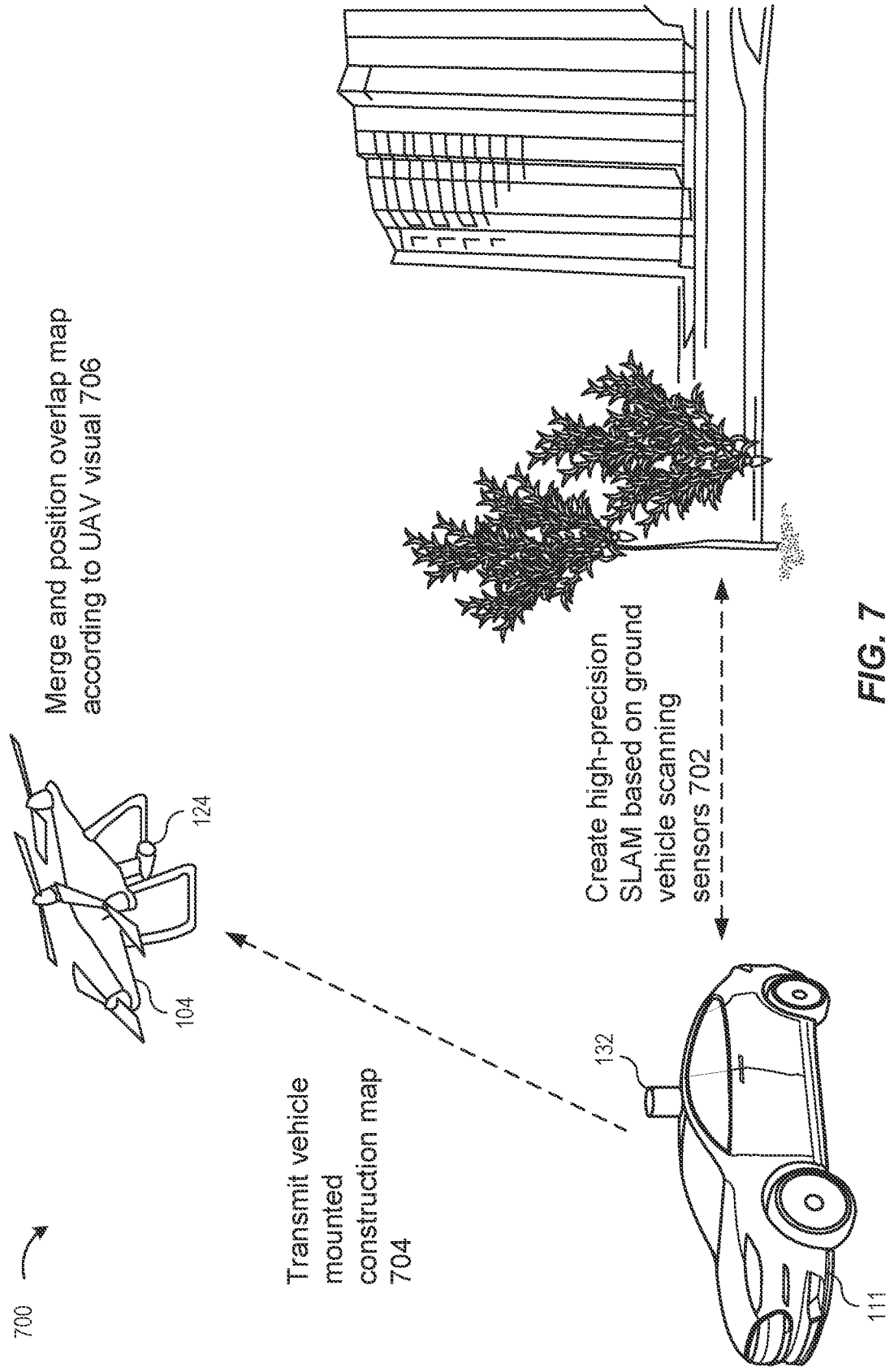
FIG. 7 illustrates an example of generating a map of a movable object environment using an aerial vehicle and a ground vehicle, in accordance with various embodiments.

FIG. 7 illustrates an example 700 of generating a map of a movable object environment using an aerial vehicle and a ground vehicle, in accordance with various embodiments. As shown in FIG. 7, At 702, ground vehicle 111 can carry out SLAM with ground vehicle scanning sensor 132. In various embodiments, SLAM techniques may be used to generate a local map using data from various sensors, including the scanning sensors and other sensors such as an IMU, a gyroscope, and other suitable sensors. The scanning sensor may be an imaging sensor or a LiDAR sensor, which can be used to obtain a real-time map of the environment in the view angle of the ground vehicle 111. With the advantage of the vehicle mounted sensors and processors, this real-time construction map is of a higher precision than a real-time map constructed by the aerial vehicle 104. In addition to the improved sensors and processing capabilities of the ground vehicle, it also provides a more stable platform from which to collect the visual or LiDAR data of the environment, providing a more accurate real-time map.

In some embodiments, the ground vehicle can request the position of the aerial vehicle from the aerial vehicle. The aerial vehicle may provide its position in GNSS coordinates or a real-time relative position obtained through combining the initial position and the real-time movement state of the aerial vehicle. In some embodiments, the ground vehicle may obtain a relative position of the aerial vehicle directly using a scanning sensor 132 or other scanning sensor coupled to the ground vehicle, such as a radar sensor, time of flight (ToF) camera, or other sensor. Using the position of the aerial vehicle, the ground vehicle can construct the real-time map and transmit it to the aerial vehicle at 704. In some embodiments, the ground vehicle may also provide its position to the aerial vehicle along with the real-time map.

At 706, the aerial vehicle can perform SLAM and positioning using its onboard scanning and positioning sensors. However, the resulting real-time map generated by the aerial vehicle may be of relatively low precision compared to the real-time map obtained from the ground vehicle. In some embodiments, the aerial vehicle can identify an overlapping portion of real-time maps and combine the real-time maps into a combined real-time map.

In some embodiments, the aerial vehicle may transmit its real-time map to the ground vehicle. The ground vehicle can then identify the overlapping portion of the real-time maps and combine them into a combined real-time map. In various embodiments, the real-time maps may be merged using scan matching techniques, or through matching features identified in each real-time map to identify the overlapping portion of the maps. The real-time maps may then be merged by mapping locations in each map to the other based on the overlapping portion. In some embodiments, the aerial vehicle may construct a real-time map using an imaging sensor, while the ground vehicle may construct a real-time map using a LiDAR sensor (or vice versa). These real-time maps may be merged by the ground vehicle, by identifying features in the image-based real-time map to features in the point cloud-based real-time map. For example, the aerial vehicle can transmit visual image information obtained by its imaging sensors to the ground vehicle. The ground vehicle can convert the coordinate system of the image-based real-time map to match the coordinate system of the point cloud data collected by the ground vehicle. The ground vehicle can then return a combined map of the matched overlapping portion to the aerial vehicle to be used for navigation.

Figure 8:
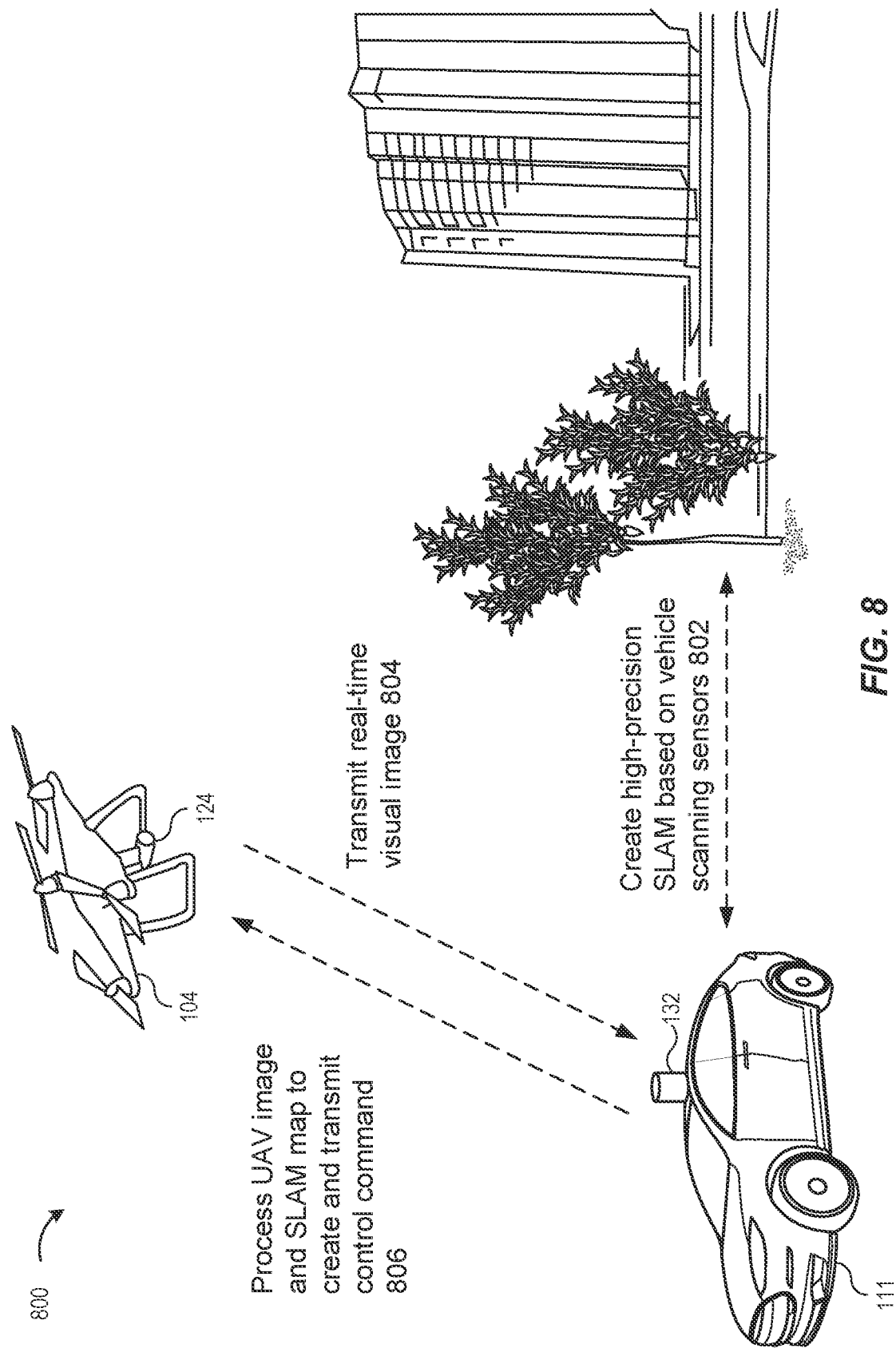
FIG. 8 illustrates an alternative example of generating a map of a movable object environment using an aerial vehicle and a ground vehicle, in accordance with various embodiments.

FIG. 8 illustrates an alternative example 800 of generating a map of a movable object environment using an aerial vehicle and a ground vehicle, in accordance with various embodiments. As shown in FIG. 8, the ground vehicle 111 can generate a high precision SLAM using its onboard scanning sensor(s) 132, as shown at 802. The aerial vehicle 104 can capture real-time image data and transmit it to the ground vehicle at 804. At 806, The ground vehicle can then generate a map using both the visual data obtained from the aerial vehicle and the SLAM generated by the ground vehicle. This offloads all map generation from the aerial vehicle to the ground vehicle, with the aerial vehicle only provided real-time image data. In some embodiments, the ground vehicle can control the aerial vehicle using the combined map it generated, by providing control data to the aerial vehicle to perform object avoidance, tailing, and other navigation tasks.

In some embodiments, the aerial vehicle 104 can provide overhead scanning data to the ground vehicle 111 (e.g., as described above with respect to FIGS. 1-5). The overhead scanning data can be used by the ground vehicle in addition, or as an alternative, to the scanning data captured by the ground vehicle's onboard sensors to generate the SLAM. The ground vehicle can then provide the resulting SLAM to the aerial vehicle 104 and/or provide control data to the aerial vehicle based on the resulting SLAM to perform various navigation tasks.

Figure 9:
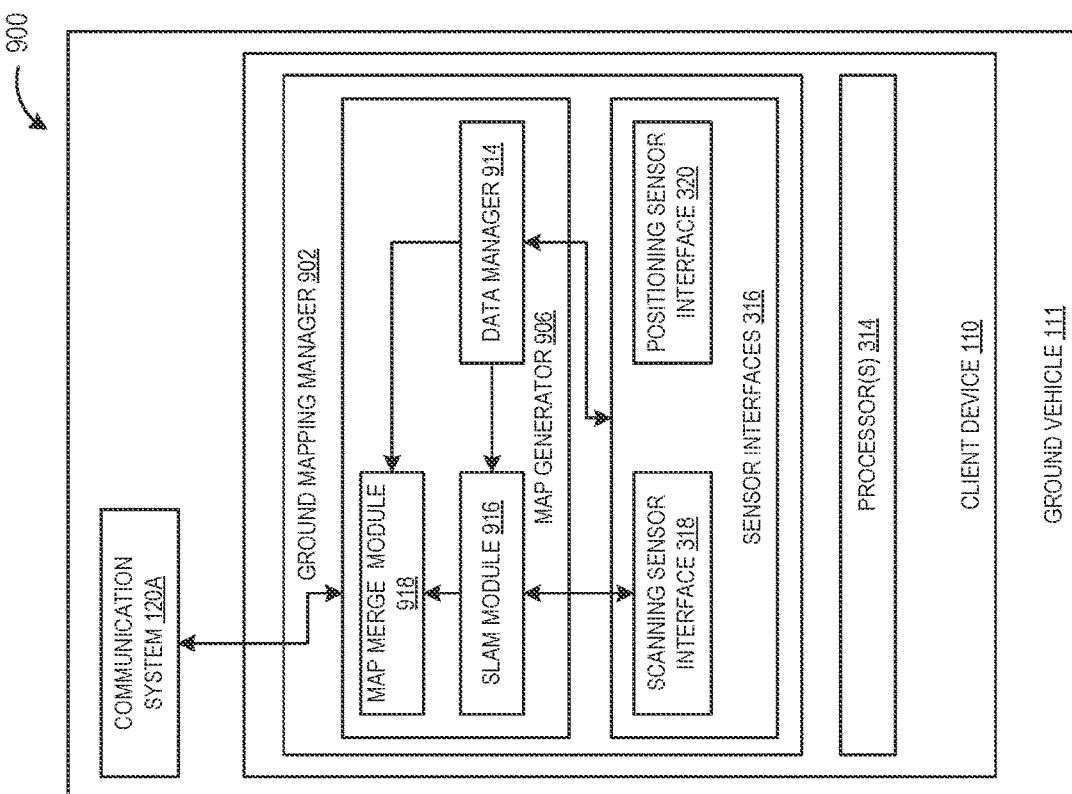
FIG. 9 illustrates an example of collaborative map construction by an aerial vehicle mapping manager and a ground vehicle mapping manager, in accordance with various embodiments.
Figure 9:
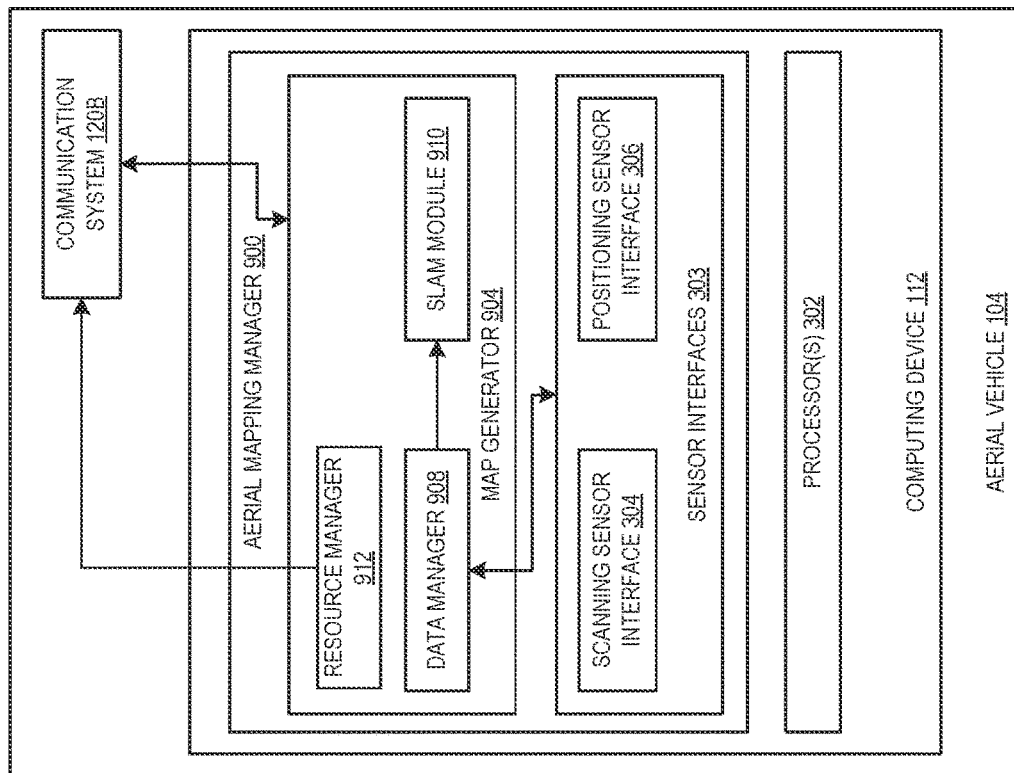

FIG. 9 illustrates an example of collaborative map construction by an aerial vehicle mapping manager and a ground vehicle mapping manager, in accordance with various embodiments. As shown in FIG. 9, an aerial mapping manager 900 may execute on one or more processors 302 of computing device 112. The one or more processors 302 may include CPUs, GPUs, FGPAs, SoCs, or other processors. The aerial mapping manager 900 may include sensor interfaces 303 and map generator 904.

Sensor interfaces 303 can include a scanning sensor interface 304 and a positioning sensor interface 306. The sensor interfaces 303 may include hardware and/or software interfaces. The scanning sensor interface 304 can receive data from the scanning sensor (e.g., an imaging device, a LiDAR sensor, or other scanning sensor) and the positioning sensor interface 306 can receive data from a positioning sensor (e.g., a GNSS sensor, RTK sensor, etc.). In various embodiments, the scanning sensor may produce data in a point cloud format. The point cloud data may be a three-dimensional representation of the target environment. In some embodiments, the point cloud data may be converted to a matrix representation. In some embodiments, the scanning sensor may produce image data, such as high definition images and/or video of the roadway environment in which the aerial vehicle is traveling. The positioning data may include GPS coordinates for the aerial vehicle.

In some embodiments, map generator 904 can include a data manager 908 which can obtain scanning data via the scanning sensor interface from the scanning sensors onboard the aerial mapping manager. The data manager can also obtain real-time position data from the aerial vehicle's positioning sensor via positioning sensor interface 306. The data manager 908 can pass the scanning data and position data to a SLAM module that implements one or more SLAM techniques. The SLAM module 910 can output a real-time map of the environment in which the aerial vehicle is traveling as well as the aerial vehicle's position within that map. As discussed, the real-time map generated by SLAM module 910 may be a relatively less precise map due, e.g., to the performance capabilities of the onboard sensors, the computing device 112, stability of the aerial vehicle in flight, etc. Once the real-time map has been generated, the map generator can pass the real-time map to the ground mapping manager on client device 110 via communication system 120B. As discussed, in some embodiments, the map generator 904 may output only scanning data, without first generating a real-time map using SLAM module 910. For example, resource manager 912 can monitor computing resource availability on computing device 112. If the available resources (e.g., memory, storage capacity, battery level, processor utilization, etc.) is below a threshold value, the resource manager 912 can instruct the data manager to provide the scanning data and position data to the ground mapping manager in a request to perform SLAM on behalf of the aerial vehicle.

Client device 110 may include a ground mapping manager 902 executing on one or more processors 314. The one or more processors 302 may include CPUs, GPUs, FGPAs, SoCs, or other processors. The ground mapping manager 902 may include sensor interfaces 316 and map generator 906. The sensor interfaces can include hardware or software interfaces that facilitate communication of data and/or commands between the ground mapping manager 902 and various scanning sensors and positioning sensors coupled to ground vehicle 111. Map generator 906 can include a data manager 914 that receives scanning data from aerial mapping manager 900 via communication system 120A, and from onboard scanning sensors coupled to ground vehicle 111 via scanning sensor interface 318. The data manager 914 may also include position data for the ground vehicle via positioning sensor interface 306. In some embodiments, the data manager 914 may also receive position data for the aerial vehicle via scanning sensor interface 304. For example, ground vehicle 111 may determine the relative position of the aerial vehicle from the ground vehicle using an onboard LiDAR sensor, or other scanning sensor. The scanning data from scanning manager 126 may include positioning data representing a position of the aerial vehicle when the scanning data was captured.

The data manager 914 can pass the scanning data and the position data to SLAM module 916 to generate a real-time map of the environment in which the ground vehicle is operating. SLAM module 916 may implement various SLAM techniques to generate the real-time map. Due to the relatively higher quality scanning sensors, the stability of the ground vehicle platform, and available computing resources, the SLAM module 916 can output a relatively higher precision real-time map. In some embodiments, the real-time map generated by SLAM module 916 and the real-time map generated by SLAM module 910 can be provided to map merge module 918. Map merge module 918 can implement scan matching techniques, feature matching techniques, or other image processing techniques to merge the two real-time maps. For example, an overlapping portion of the two real-time maps can be identified based on common features identified in both maps. The resulting combined map can be provided to the aerial vehicle via communication system 120A to be used to perform various navigation operations. In some embodiments, only the overlapping portion of the two real-time maps is provided to the aerial vehicle. In some embodiments, SLAM module 916 can generate the real-time map based on scanning data obtained from the aerial vehicle directly, rather than using a SLAM map generated by the aerial mapping manager 900, and scanning data obtained from the ground vehicle. In such embodiments, the output real-time map can be provided to the aerial vehicle without the additional merging step. In some embodiments, the combined real-time map can be used by the ground vehicle to control the aerial vehicle, without providing the combined real-time map to the aerial vehicle. Instead, the ground vehicle can generate navigation commands that are transmitted to the aerial vehicle and converted by the aerial vehicle's flight controller into movement commands.

Although embodiments are discussed with respect to an aerial vehicle-ground vehicle pair, in various embodiments, one aerial vehicle may provide scanning data to a plurality of ground vehicles. Additionally, in some embodiments, a plurality of aerial vehicles may be in communication with the ground vehicle, with each aerial vehicle capturing scanning data at a different position and transmitting the scanning data to the ground vehicle. In some embodiments, the ground vehicle can be an autonomous vehicle. Alternatively, the ground vehicle can be a manually driven vehicle that includes appropriate scanning sensors and position sensors as described herein.

Figure 10:
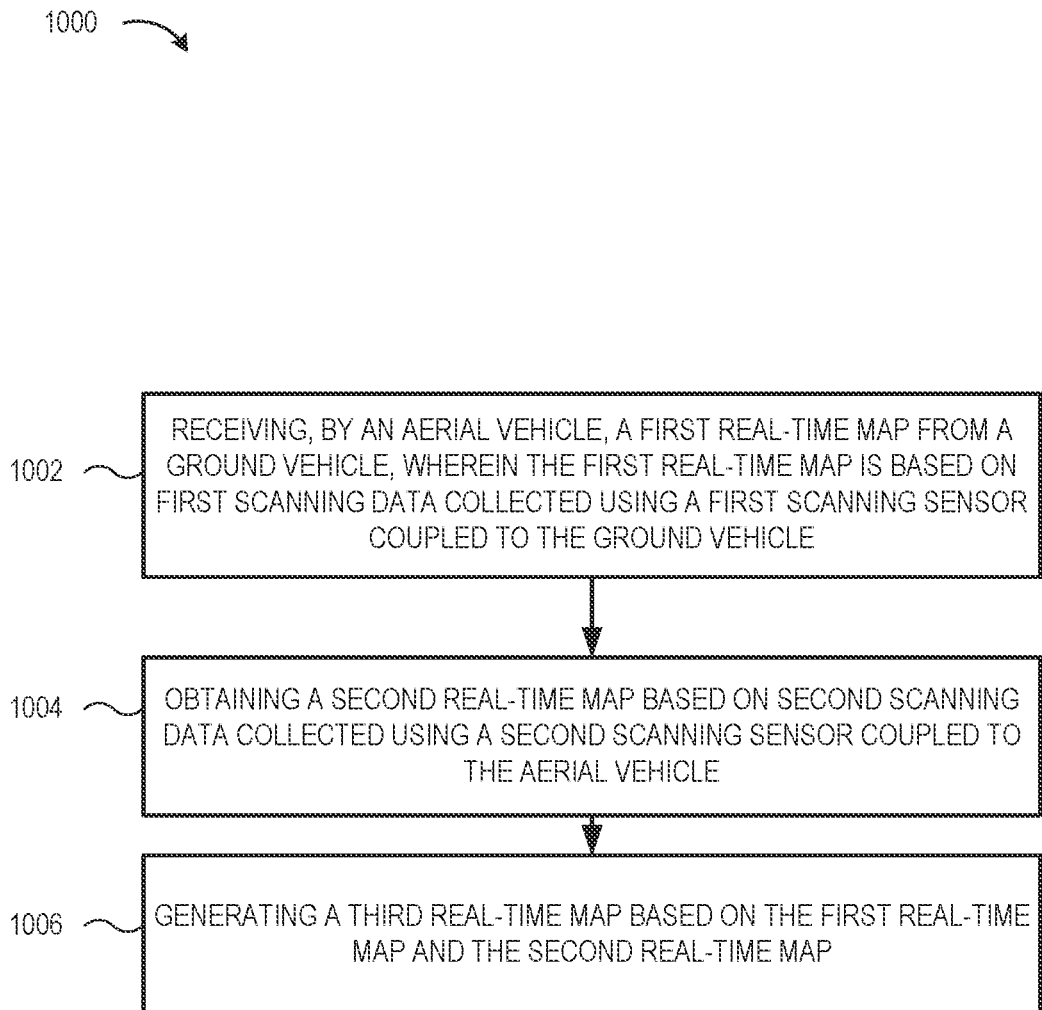
FIG. 10 shows a flowchart of a method of collaborative map construction in a movable object environment, in accordance with various embodiments.

FIG. 10 shows a flowchart of a method 1000 of collaborative map construction in a movable object environment, in accordance with various embodiments. At 1002, an aerial vehicle can receive a first real-time map from a ground vehicle. The first real-time map is based on first scanning data collected using a first scanning sensor coupled to the ground vehicle. In some embodiments, receiving, by an aerial vehicle, a first real-time map from a ground vehicle, wherein the first real-time map is based on first scanning data collected using a first scanning sensor coupled to the ground vehicle, can include transmitting the second real-time map to the ground vehicle, the ground vehicle configured to convert coordinates in the second real-time map to a coordinate system to match the first real-time map, determine an overlapping portion of the first real-time map and the second real-time map in the coordinate system, and transmit with the overlapping portion to the aerial vehicle. In some embodiments, receiving the real-time map can include receiving position information of the aerial vehicle from the ground vehicle. In some embodiments, the position information includes a real-time relative position determined using the first scanning sensor. In some embodiments, the position information includes global navigation satellite system (GNSS) received from the aerial vehicle. In some embodiments, the ground vehicle is an autonomous vehicle.

At 1004, a second real-time map can be obtained, the second real-time map based on second scanning data collected using a second scanning sensor coupled to the aerial vehicle. In some embodiments, the first real-time map is a higher precision map than the second real-time map. At 1006, a third real-time map can be generated based on the first real-time map and the second real-time map. In some embodiments, generating a third real-time map based on the first real-time map and the second real-time map, can include determining an overlapping portion of the first real-time map and the second real-time map, and merging the first real-time map and the second real-time map using the overlapping portion.

In some embodiments, the first scanning sensor includes a LiDAR sensor and the second scanning sensor includes a visual sensor. The first real-time map is constructed based on point cloud data obtained from the first scanning sensor, and the second real-time map is constructed based on visual data obtained from the second scanning sensor.

In some embodiments, the method may further include determining available resources associated with the aerial vehicle are below a threshold value, sending a request to the ground vehicle to generate the third real-time map, the request including the second real-time map, and receiving the third real-time map from the ground vehicle.

In some embodiments, the method may further include obtaining a plurality of real-time maps from a plurality of aerial vehicles communication with the ground vehicle, generating a fourth real-time map based on the first real-time map and each corresponding real-time map from the plurality of aerial vehicles, and transmitting the fourth real-time map to each of the plurality of aerial vehicles.

In some embodiments, the ground vehicle is configured to obtain third scanning data from a third scanning sensor coupled to the ground vehicle, the first scanning sensor including a LiDAR sensor and the third scanning sensor including an imaging sensor, and generate the first real-time map based on the first scanning data and the third scanning data using a Simultaneous Localization and Mapping (SLAM) algorithm.

In some embodiments, the method may further include transmitting the second scanning data to the ground vehicle, wherein the ground vehicle is configured to generate the first real-time map based on the first scanning data and the second scanning data using a Simultaneous Localization and Mapping (SLAM) algorithm, wherein the first scanning sensor includes a LiDAR sensor and the second scanning sensor includes an imaging sensor.

In some embodiments, a system for generating a map based on sensor information from multiple vehicles can include an aerial vehicle including a first computing device and a first scanning sensor, and a ground vehicle including a second computing device and a second scanning sensor. The first computing device may include at least one processor and a scanning manager, the scanning manager including first instructions which, when executed by the processor, cause the scanning manager to obtain first scanning data from the first scanning sensor from an overhead perspective, and transmit the first scanning data to the second computing device. The second computing device may include at least one processor and a detection manager, the detection manager including second instructions which, when executed by the processor, cause the detection manager to receive the first scanning data from the first computing device, generate a local map based at least in part on the first scanning data, and execute a navigation control command based at least in part on the local map. As discussed, various SLAM techniques may be used to generate the local map based on data from multiple sensors including the scanning sensors and other sensors such as an IMU, gyroscope, etc.

In some embodiments, the second computing device can be further configured to obtain second scanning data from the second scanning sensor. The second scanning data is obtained from the second scanning sensor from a forward perspective. In some embodiments, to generate a local map based at least in part on the first scanning data, the second instructions, when executed, further cause the detection manager to transform the second scanning data from the forward perspective to the overhead perspective to obtain transformed second scanning data based at least in part on the first scanning data, and generate the local map based on the transformed second scanning data. In some embodiments, to generate a local map based at least in part on the first scanning data, the second instructions, when executed, further cause the detection manager to identify a portion of the first scanning data that corresponds to a portion of the second scanning data and generate the local map based on the identified portion of the first scanning data. In various embodiments, scan matching and other techniques as discussed above may be used to identify the portion of the first scanning data that corresponds to a portion of the second scanning data. The portion of the first scanning data and the portion of the second scanning data may include a representation of a same area of a roadway environment.

Figure 11:
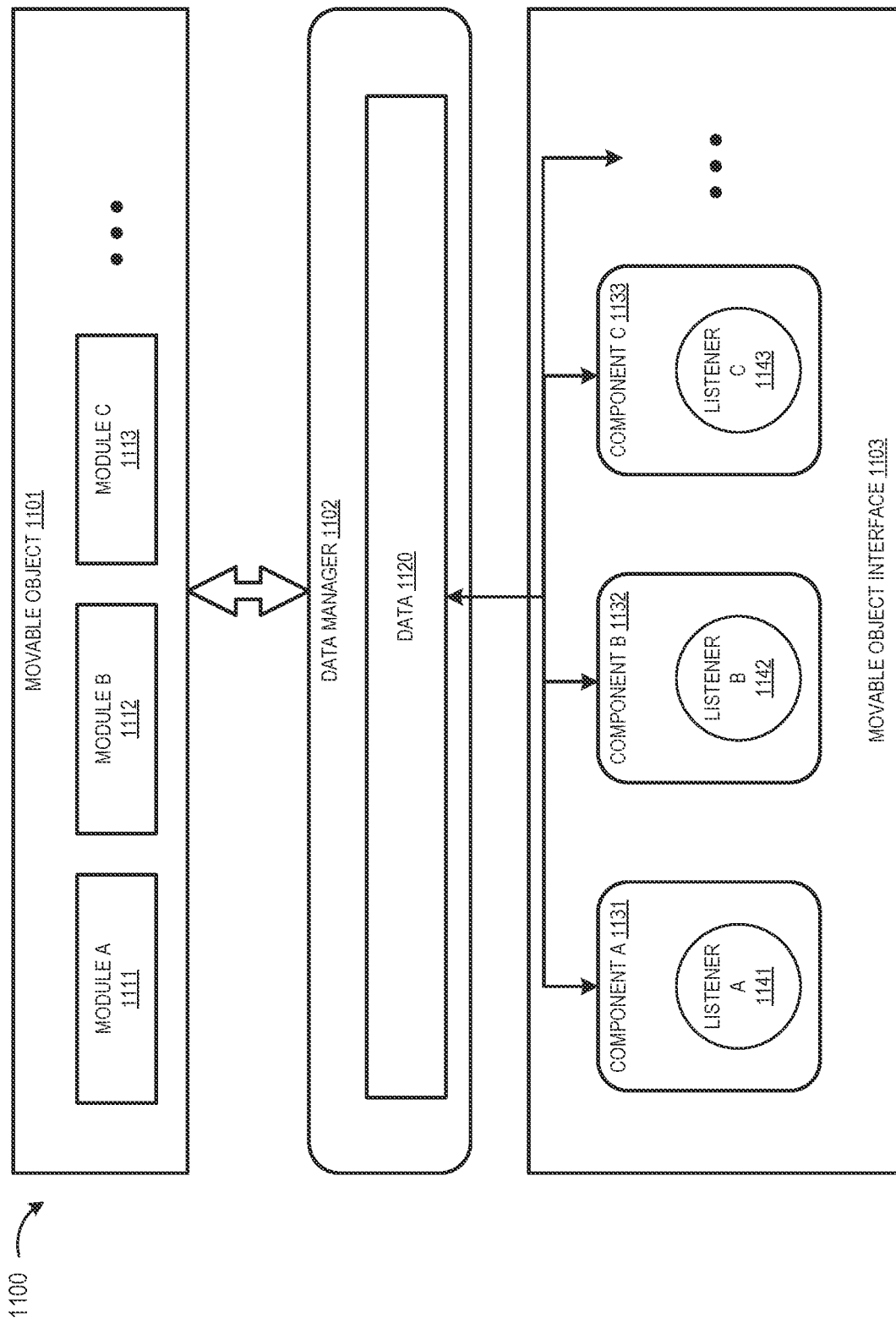
FIG. 11 illustrates an example of supporting a movable object interface in a software development environment, in accordance with various embodiments.

FIG. 11 illustrates an example of supporting a movable object interface in a software development environment, in accordance with various embodiments. As shown in FIG. 11, a movable object interface 1103 can be used for providing access to a movable object 1101 in a software development environment 1100, such as a software development kit (SDK) environment. As discussed above, the scanning manager can be implemented using an SDK or mobile SDK to enable applications to perform real-time mapping, as described herein.

Furthermore, the movable object 1101 can include various functional modules A-C 1111-1113, and the movable object interface 1103 can include different interfacing components A-C 1131-1133. Each said interfacing component A-C 1131-1133 in the movable object interface 1103 can represent a module A-C 1111-1113 in the movable object 1101.

In accordance with various embodiments, the movable object interface 1103 can provide one or more callback functions for supporting a distributed computing model between the application and movable object 1101.

The callback functions can be used by an application for confirming whether the movable object 1101 has received the commands. Also, the callback functions can be used by an application for receiving the execution results. Thus, the application and the movable object 1101 can interact even though they are separated in space and in logic.

As shown in FIG. 11, the interfacing components A-C 1131-1133 can be associated with the listeners A-C 1141-1143. A listener A-C 1141-1143 can inform an interfacing component A-C 1131-1133 to use a corresponding callback function to receive information from the related module(s).

Additionally, a data manager 1102, which prepares data 1120 for the movable object interface 1103, can decouple and package the related functionalities of the movable object 1101. Also, the data manager 1102 can be used for managing the data exchange between the applications and the movable object 1101. Thus, the application developer does not need to be involved in the complex data exchanging process.

For example, the SDK can provide a series of callback functions for communicating instance messages and for receiving the execution results from an unmanned aircraft. The SDK can configure the life cycle for the callback functions in order to make sure that the information interchange is stable and completed. For example, the SDK can establish connection between an unmanned aircraft and an application on a smart phone (e.g. using an Android system or an iOS system). Following the life cycle of a smart phone system, the callback functions, such as the ones receiving information from the unmanned aircraft, can take advantage of the patterns in the smart phone system and update the statements accordingly to the different stages in the life cycle of the smart phone system.

Figure 12:
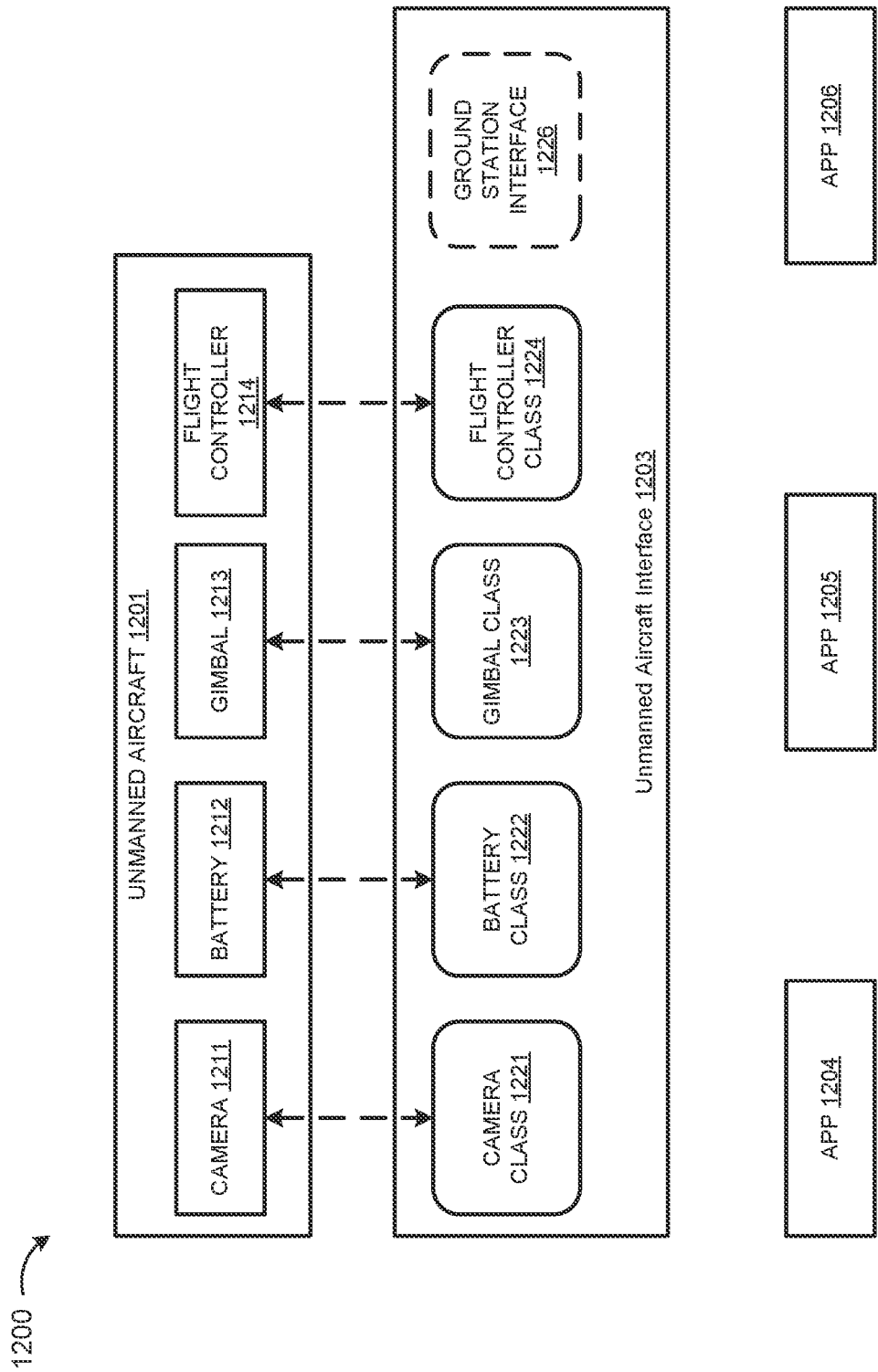
FIG. 12 illustrates an example of an unmanned aircraft interface, in accordance with various embodiments.

FIG. 12 illustrates an example of an unmanned aircraft interface, in accordance with various embodiments. As shown in FIG. 12, an unmanned aircraft interface 1203 can represent an unmanned aircraft 1201. Thus, the applications, e.g. APPs 1204-1206, in the unmanned aircraft environment 1200 can access and control the unmanned aircraft 1201.

For example, the unmanned aircraft 1201 can include various modules, such as a camera 1211, a battery 1212, a gimbal 1213, and a flight controller 1214.

Correspondently, the movable object interface 1203 can include a camera component 1221, a battery component 1222, a gimbal component 1223, and a flight controller component 1224.

Additionally, the movable object interface 1203 can include a ground station component 1226, which is associated with the flight controller component 1224. The ground station component operates to perform one or more flight control operations, which may require a high-level privilege.

Figure 13:
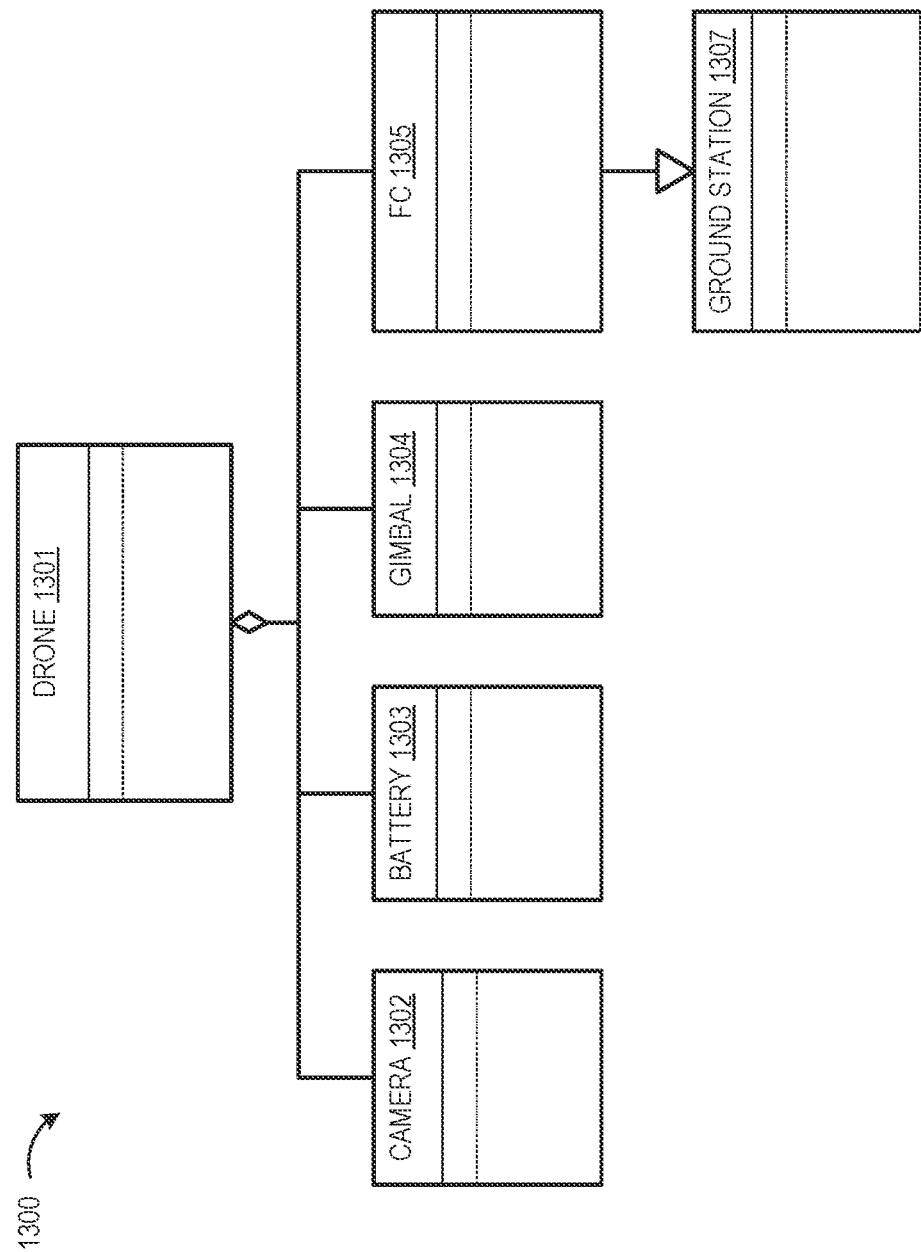
FIG. 13 illustrates an example of components for an unmanned aircraft in a software development kit (SDK), in accordance with various embodiments.

FIG. 13 illustrates an example of components for an unmanned aircraft in a software development kit (SDK), in accordance with various embodiments. The SDK may correspond to all or a portion of the scanning manager described above or may be used to implement the scanning manager as a standalone application. As shown in FIG. 13, the drone class 1301 in the SDK 1300 is an aggregation of other components 1302-1307 for an unmanned aircraft (or a drone). The drone class 1301, which have access to the other components 1302-1307, can exchange information with the other components 1302-1307 and controls the other components 1302-1307.

In accordance with various embodiments, an application may be accessible to only one instance of the drone class 1301. Alternatively, multiple instances of the drone class 1301 can present in an application.

In the SDK, an application can connect to the instance of the drone class 1301 in order to upload the controlling commands to the unmanned aircraft. For example, the SDK may include a function for establishing the connection to the unmanned aircraft. Also, the SDK can disconnect the connection to the unmanned aircraft using an end connection function. After connecting to the unmanned aircraft, the developer can have access to the other classes (e.g. the camera class 1302 and the gimbal class 1304). Then, the drone class 1301 can be used for invoking the specific functions, e.g. providing access data which can be used by the flight controller to control the behavior, and/or limit the movement, of the unmanned aircraft.

In accordance with various embodiments, an application can use a battery class 1303 for controlling the power source of an unmanned aircraft. Also, the application can use the battery class 1303 for planning and testing the schedule for various flight tasks.

As battery is one of the most restricted elements in an unmanned aircraft, the application may seriously consider the status of battery not only for the safety of the unmanned aircraft but also for making sure that the unmanned aircraft can finish the designated tasks. For example, the battery class 1303 can be configured such that if the battery level is low, the unmanned aircraft can terminate the tasks and go home outright.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 1302 for defining various operations on the camera in a movable object, such as an unmanned aircraft. For example, in SDK, the Camera Class includes functions for receiving media data in SD card, getting & setting photo parameters, taking photo and recording videos.

An application can use the camera class 1302 for modifying the setting of photos and records. For example, the SDK may include a function that enables the developer to adjust the size of photos taken. Also, an application can use a media class for maintaining the photos and records.

In accordance with various embodiments, an application can use a gimbal class 1304 for controlling the view of the unmanned aircraft. For example, the Gimbal Class can be used for configuring an actual view, e.g. setting a first personal view of the unmanned aircraft. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 1305 for providing various flight control information and status about the unmanned aircraft. As discussed, the flight controller class can include functions for receiving and/or requesting access data to be used to control the movement of the unmanned aircraft across various regions in an unmanned aircraft environment.

Using the Main Controller Class, an application can monitor the flight status, e.g. using instant messages. For example, the callback function in the Main Controller Class can send back the instant message every one thousand milliseconds (1000 ms).

Furthermore, the Main Controller Class allows a user of the application to investigate the instance message received from the unmanned aircraft. For example, the pilots can analyze the data for each flight in order to further improve their flying skills.

In accordance with various embodiments, an application can use a ground station class 1307 to perform a series of operations for controlling the unmanned aircraft.

For example, the SDK may require applications to have a SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the unmanned aircraft.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A system for collaborative map construction, comprising:
    a ground vehicle including a first computing device;
    a first scanning sensor coupled to the ground vehicle;
    an aerial vehicle including a second computing device;
    a second scanning sensor coupled to the aerial vehicle;
    the first computing device including at least one processor and a ground vehicle mapping manager, the ground vehicle mapping manager including first instructions which, when executed by the processor, cause the ground vehicle mapping manager to:
    obtain a first real-time map of environment in which the ground vehicle is located from a front-view perspective based on first scanning data using the first scanning sensor; and
    transmit the first real-time map and position information to the aerial vehicle;
    the second computing device including at least one processor and an aerial vehicle mapping manager, the aerial vehicle mapping manager including second instructions which, when executed by the processor, cause the aerial vehicle mapping manager to:
    receive the first real-time map and the position information from the first computing device;
    obtain a second real-time map of the environment from an overhead perspective based on second scanning data collected using the second scanning sensor; and
    generate a third real-time map of the environment from the overhead perspective based on the first real-time map and the second real-time map,
    wherein the third real-time map has precision higher than the second real-time map.

2. The system of claim 1, wherein the first real-time map is a higher precision map than the second real-time map.

3. The system of claim 1, wherein to obtain the third real-time map based on the first real-time map and the second real-time map, the second instructions, when executed, further cause the aerial vehicle mapping manager to:
    determine an overlapping portion of the first real-time map and the second real-time map; and
    merge the first real-time map and the second real-time map using the overlapping portion.

4. The system of claim 1, wherein the first scanning sensor includes a LiDAR sensor and the second scanning sensor includes a visual sensor.

5. The system of claim 4, wherein the first real-time map is constructed based on point cloud data obtained from the first scanning sensor, and the second real-time map is constructed based on visual data obtained from the second scanning sensor.

6. The system of claim 5, wherein to obtain the first real-time map based on the first scanning data collected from a view angle of the ground vehicle using the first scanning sensor, the first instructions, when executed, further cause the ground vehicle mapping manager to:
  obtain the second real-time map from the aerial vehicle;
  convert coordinates in the second real-time map to a coordinate system to match the first real-time map;
  determine an overlapping portion of the first real-time map and the second real-time map in the coordinate system; and
  transmit with the overlapping portion to the aerial vehicle.

7. The system of claim 1, wherein the second instructions, when executed, further cause the aerial vehicle mapping manager to:
  determine available resources associated with the second computing device are below a threshold value;
  send a request to the first computing device to generate the third real-time map, the request including the second real-time map; and
  receive the third real-time map from the first computing device.

8. A method for collaborative map construction, comprising:
  receiving, by an aerial vehicle, a first real-time map of environment in which a ground vehicle is located from a front-view perspective and position information from the ground vehicle, wherein the first real-time map is based on first scanning data collected using a first scanning sensor coupled to the ground vehicle;
  obtaining a second real-time map of the environment from an overhead perspective based on second scanning data collected using a second scanning sensor coupled to the aerial vehicle; and
  generating a third real-time map of the environment from the overhead perspective based on the first real-time map and the second real-time map,
  wherein the third real-time map has precision higher than the second real-time map.

9. The method of claim 8, wherein receiving, by the aerial vehicle, the first real-time map from the ground vehicle, further comprises:
  receiving position information of the aerial vehicle from the ground vehicle.

10. The method of claim 8, wherein the position information includes global navigation satellite system (GLASS) received from the aerial vehicle.

11. The method of claim 8, wherein the position information includes a real-time relative position determined using the first scanning sensor.

12. The method of claim 8, wherein the ground vehicle is an autonomous vehicle.

13. The method of claim 8, wherein the ground vehicle is configured to obtain third scanning data from a third scanning sensor coupled to the ground vehicle, the first scanning sensor including a LiDAR sensor and the third scanning sensor including an imaging sensor, and generate the first real-time map based on the first scanning data and the third scanning data using a Simultaneous Localization and Mapping (SLAM) algorithm.

14. The method of claim 8, further comprising:
  transmitting the second scanning data to the ground vehicle, wherein the ground vehicle is configured to generate the first real-time map based on the first scanning data and the second scanning data using a Simultaneous Localization and Mapping (SLAM) algorithm, wherein the first scanning sensor includes a LiDAR sensor and the second scanning sensor includes an imaging sensor.

15. A non-transitory computer readable storage medium including instructions stored thereon which, when executed by one or more processors, cause the one or more processors to:
  receive, by an aerial vehicle, a first real-time map of environment in which a ground vehicle is located from a front-view perspective and position information from the ground vehicle, wherein the first real-time map is based on first scanning data collected using a first scanning sensor coupled to the ground vehicle;
  obtain a second real-time map of the environment from an overhead perspective based on second scanning data collected using a second scanning sensor coupled to the aerial vehicle; and
  generate a third real-time map of the environment from the overhead perspective based on the first real-time map and the second real-time map,
  wherein the third real-time map has precision higher than the second real-time map.

16. The non-transitory computer readable storage medium of claim 15, wherein the first real-time map is constructed based on point cloud data obtained from the first scanning sensor, and the second real-time map is constructed based on visual data obtained from the second scanning sensor.

17. The non-transitory computer readable storage medium of claim 16, wherein to receive, by the aerial vehicle, the first real-time map from the ground vehicle, wherein the first real-time map is based on the first scanning data collected using the first scanning sensor coupled to the ground vehicle, the instructions, when executed, further cause the one or more processors to:
  transmit the second real-time map to the ground vehicle, wherein the ground vehicle is configured to:
    convert coordinates in the second real-time map to a coordinate system to match the first real-time map;
    determine an overlapping portion of the first real-time map and the second real-time map in the coordinate system; and
    transmit with the overlapping portion to the aerial vehicle.

18. The non-transitory computer readable storage medium of claim 15, wherein the instructions, when executed, further cause the one or more processors to:
  determine available resources associated with the aerial vehicle are below a threshold value;
  send a request to the ground vehicle to generate the third real-time map, the request including the second real-time map; and
  receive the third real-time map from the ground vehicle.

19. The non-transitory computer readable storage medium of claim 15, wherein the instructions, when executed, further cause the one or more processors to:
  receive the third real-time map from the aerial vehicle;
  generate control data based on the third real-time map to navigate the aerial vehicle; and
  transmit the control data to the aerial vehicle.

20. The non-transitory computer readable storage medium of claim 15, wherein the instructions, when executed, further cause the one or more processors to:
  generate control data based on the third real-time map to navigate the aerial vehicle.

21. The system of claim 1, wherein the position information transmitted from the ground vehicle to the aerial vehicle is position information of the aerial vehicle.

* * * * *